US012235701B2

United States Patent
Aurongzeb et al.

(10) Patent No.: US 12,235,701 B2
(45) Date of Patent: Feb. 25, 2025

(54) SYSTEM AND METHOD TO REDUCE REDUNDANT DATA PROCESSING TASKS EXECUTING ACROSS INTERCONNECTED INTERNET OF THINGS (IoT) EDGE DEVICES AMONG DATA CENTERS VIA A PRIMARY PROCESSING ORCHESTRATION NODE

(71) Applicant: Dell Products, LP, Round Rock, TX (US)

(72) Inventors: Deeder M. Aurongzeb, Austin, TX (US); Malathi Ramakrishnan, Tamil Nadu (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 160 days.

(21) Appl. No.: 18/196,153

(22) Filed: May 11, 2023

(65) Prior Publication Data

US 2024/0377873 A1 Nov. 14, 2024

(51) Int. Cl.
*G06F 1/3206* (2019.01)
(52) U.S. Cl.
CPC .................................. *G06F 1/3206* (2013.01)
(58) Field of Classification Search
CPC .... G06F 1/3206; G06F 1/3203; G06F 1/3209; G06F 1/3212; G06F 1/3215; G06F 1/3224; G06F 1/325
See application file for complete search history.

(56) References Cited

U.S. PATENT DOCUMENTS

| 7,468,661 | B2 | 12/2008 | Petite |
| 7,715,951 | B2 | 5/2010 | Forbes, Jr. |
| 7,742,830 | B1 * | 6/2010 | Botes .................... G06F 9/4893 700/32 |
| 7,958,229 | B2 * | 6/2011 | Conway ................. H04L 45/00 709/224 |
| 8,013,732 | B2 | 9/2011 | Petite |
| 8,626,450 | B2 | 1/2014 | Dooley |

(Continued)

FOREIGN PATENT DOCUMENTS

WO 2011/106160 A2 9/2011

*Primary Examiner* — Raymond N Phan
(74) *Attorney, Agent, or Firm* — Prol Intellectual Property Law, PLLC; H. Kenneth Prol

(57) ABSTRACT

An information handling system of an orchestrating Internet of Things (IoT) gateway executing a carbon dioxide ($CO_2$) minimizing IoT edge gateway data processing orchestration system comprises a network interface device receiving processed IoT sensor data generated by alteration of unprocessed IoT sensor data via access point (AP) IoT servers executing a common data processing method, a processor executing code instructions to determine that an initial volume of $CO_2$ emitted per unit of processed sensor data transferred from the AP IoT servers to a cloud platform, via the orchestrating IoT gateway in an enterprise wide area network, is greater than an adjusted volume of estimated $CO_2$ that would be emitted per unit of data if the common data processing method were performed at the orchestrating IoT gateway instead of the AP IoT servers, and transmitting an instruction to cease execution of the common data processing method at the AP IoT servers.

20 Claims, 5 Drawing Sheets

(56) References Cited

U.S. PATENT DOCUMENTS

| | | | |
|---|---|---|---|
| 9,014,996 B2 | 4/2015 | Kamel | |
| 9,571,582 B2 | 2/2017 | Petite | |
| 2007/0260417 A1* | 11/2007 | Starmer | G01K 7/425 |
| | | | 374/E7.043 |
| 2009/0292617 A1 | 11/2009 | Sperling | |
| 2010/0070404 A1 | 3/2010 | McConnell | |
| 2010/0191998 A1* | 7/2010 | Moore | G06Q 10/06 |
| | | | 713/340 |
| 2013/0066477 A1 | 3/2013 | Jiang | |
| 2014/0100937 A1 | 4/2014 | Na | |
| 2014/0316964 A1 | 10/2014 | Slutsker | |
| 2016/0334824 A1 | 11/2016 | Forbes, Jr. | |
| 2018/0007164 A1* | 1/2018 | Ruxton | G06F 11/0766 |
| 2023/0273663 A1* | 8/2023 | Seibel | G06F 1/329 |
| | | | 713/320 |

\* cited by examiner

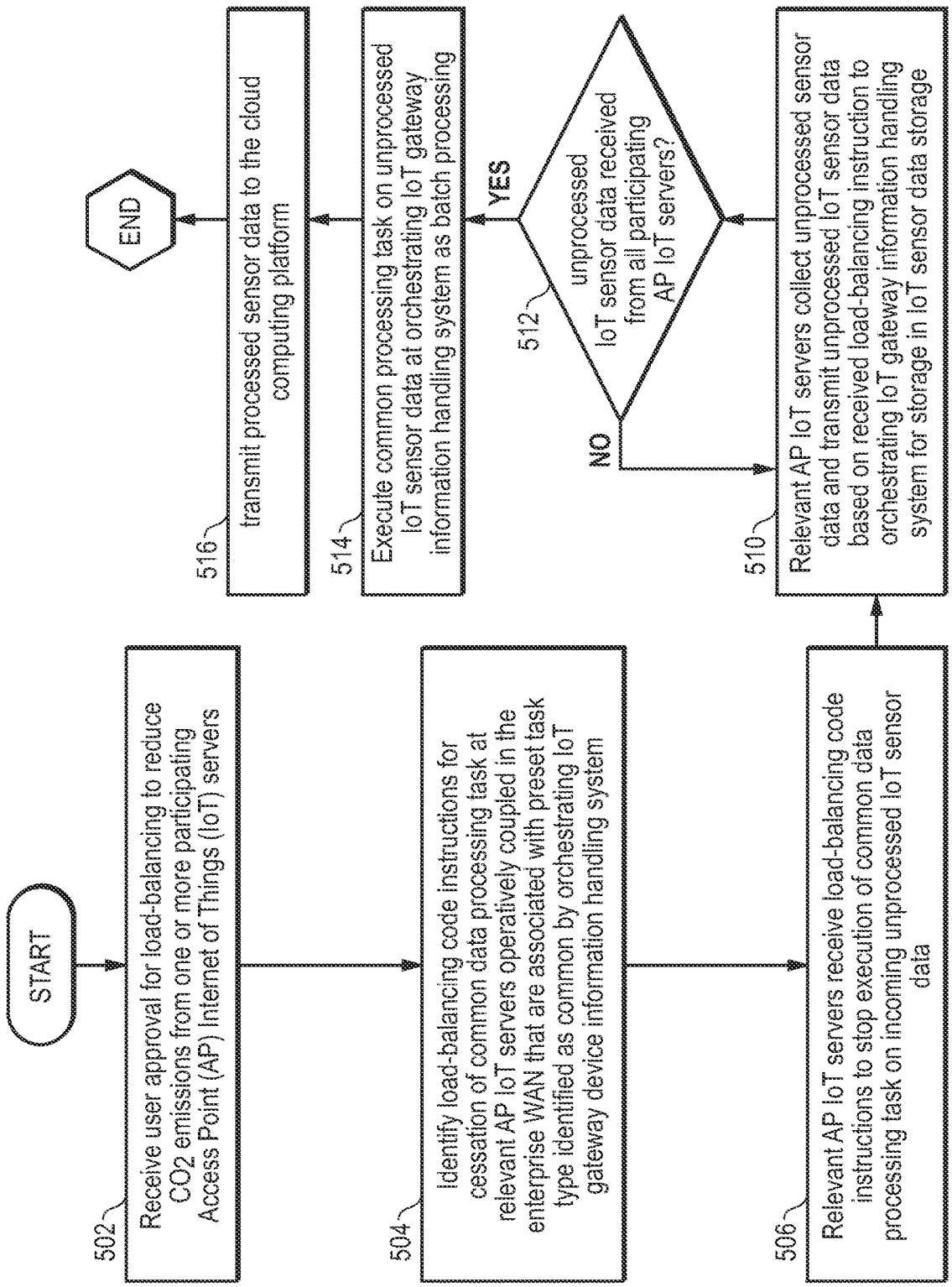

SYSTEM AND METHOD TO REDUCE REDUNDANT DATA PROCESSING TASKS EXECUTING ACROSS INTERCONNECTED INTERNET OF THINGS (IoT) EDGE DEVICES AMONG DATA CENTERS VIA A PRIMARY PROCESSING ORCHESTRATION NODE

FIELD OF THE DISCLOSURE

The present disclosure generally relates to minimizing an amount of greenhouse gas emissions that may be attributable to transceiving of data between Access Point (AP) Internet of Things (IoT) servers and orchestrating IoT gateway device information handling systems that communicate with a backend cloud application. More specifically, the present disclosure relates to a $CO_2$ minimizing IoT edge gateway data processing orchestration system for shifting execution of IoT sensor data processing tasks executed commonly at a plurality of AP IoT servers to the orchestrating IoT gateway device information handling system to decrease the volume of data transmitted via an enterprise wide area network (WAN) and $CO_2$ emitted.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, data centers, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a flow diagram illustrating a method of shifting execution of a common IoT data processing task from a plurality of AP IoT servers to an orchestrating IoT gateway device information handling system to minimize $CO_2$ emissions in transmission of IoT data according to an embodiment of the present disclosure.

The use of the same reference symbols in different drawings may indicate similar or identical items.

DETAILED DESCRIPTION OF THE DRAWINGS

Figure 1:
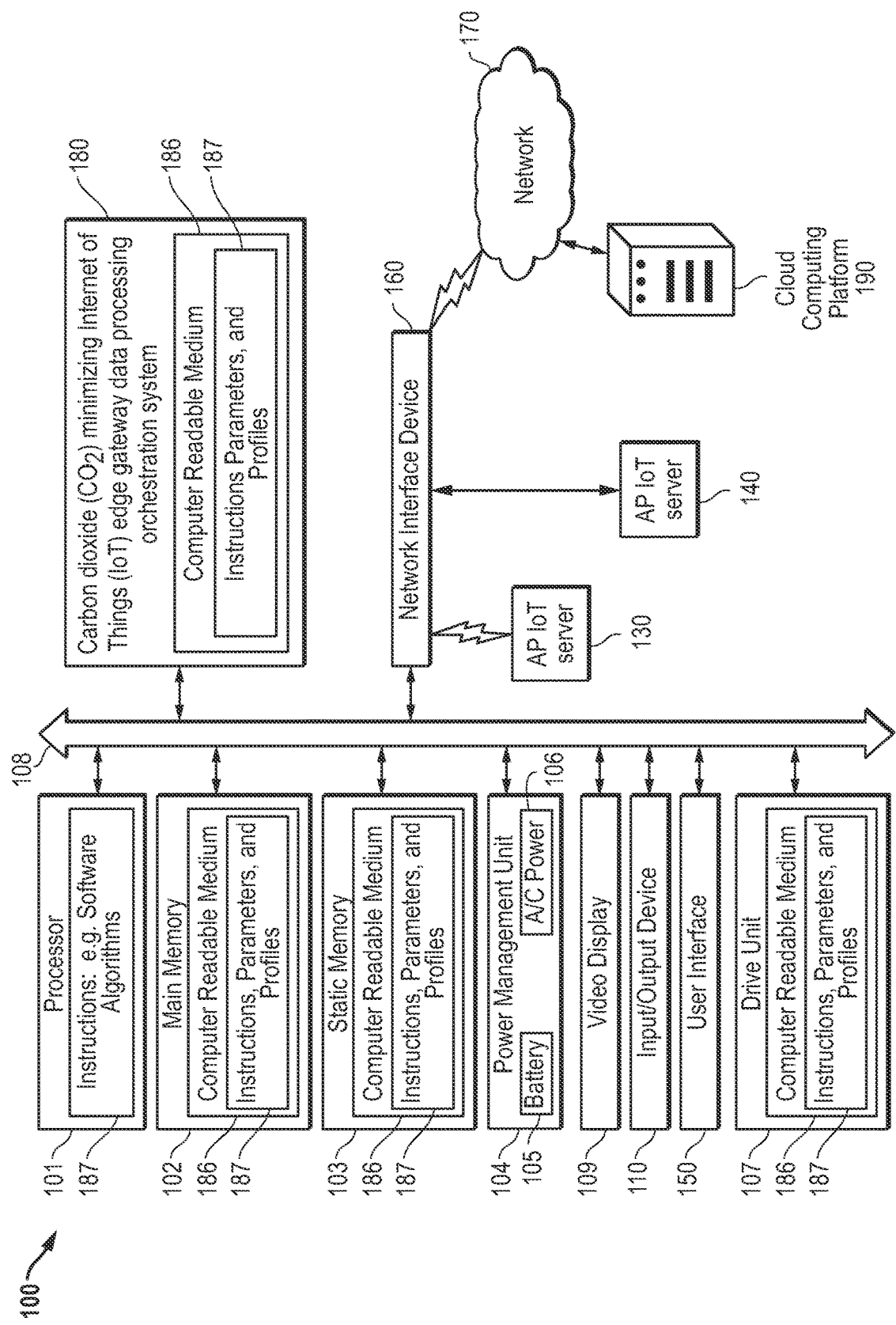
FIG. 1 is a block diagram illustrating an Internet of Things (IoT) gateway device information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the amount of GHG emissions generated during manufacture or use of a product is projected to sway an end consumer's purchasing decision to an increasingly large degree over the coming years. Further, such emissions may also influence a cloud computing customer's selection of cloud-based computing resources, including Internet of Things (IoT) sensors, access point (AP) IoT servers and orchestrating IoT gateway device information handling systems operating within a single mobile network operator (MNO) or mobile virtual network operator (MVNO) network of an enterprise-controlled wide area network (WAN).

The IoT sensors and AP IoT servers in embodiments of the present disclosure may operate within a low-power wide area networks (LPWANs) in accordance with the 3GPP narrow band (NB) IoT data transmission standard. AP IoT servers and orchestrating IoT gateway device information handling systems in embodiments of the present disclosure may operate within an MNO or MVNO network of an enterprise WAN. A final portion of IoT data transfer may include links between the orchestrating IoT gateway device information handling systems and cloud computing resources hosting enterprise applications in embodiments of the present disclosure. This enables devices to operate in existing private enterprise WANs such as MNOs to transfer IoT sensor data over potentially large distance ranges (e.g., akin to the wide area network (WAN) design of cellular technologies such as Global System for Mobile Communications (GSM) and Long Term Evolution (LTE)). In order to cover potentially large areas while ensuring low power consumption of IoT sensors, NB-IoT employs a physical layer with signals and channels that includes a plurality of AP IoT sensors transmitting IoT sensor data to one of a plurality of AP IoT servers. To meet the requirements of extended coverage in rural areas and deep indoors, AP IoT servers may link further distances with an MNO or MVNO network as an enterprise WAN and the orchestrating IoT gateway device information handling system may consequently transmit the IoT sensor data to a cloud computing platform via at least one public link (e.g., the internet). The MNO or MVNO may own or rent specific frequency ranges within existing cellular network frequency bands at which only the MNO or MVNO operator of the enterprise WAN may transmit IoT sensor data or any other signals. Thus, control of location of execution of processing tasks or location placement of orchestrating IoT gateway device information handling systems may be controlled.

GHGs emitted by IoT sensor data transmission connections between such a plurality of AP IoT servers and any one of such orchestrating IoT gateway device information handling systems within an MNO or MVNO of an enterprise WAN network may be dependent upon power consumed during transceiving of IoT sensor data between the plurality of AP IoT servers and the orchestrating IoT gateway device, and between the orchestrating IoT gateway device information handling system and the cloud computing platform. Power consumed at these stages may in turn be dependent on the amount or volume of IoT sensor data transmitted (e.g., in Gb), and the geographic locations of the AP IoT servers and the orchestrating IoT gateway device information handling system. A solution is needed to minimize the total $CO_2$ emitted during such IoT sensor data transfer between a plurality of AP IoT servers and orchestrating IoT gateway device information handling system of an MNO or MVNO enterprise WAN and a cloud computing platform.

A hardware processor of an orchestrating IoT gateway device information handling system executing code instructions of the $CO_2$ minimizing IoT edge gateway data processing orchestration system in embodiments of the present disclosure addresses this issue by shifting common IoT sensor data processing tasks performed on incoming unprocessed IoT sensor data at one or more AP IoT servers to execute at the orchestrating IoT gateway device information handling system instead. Current IoT sensor neighborhoods are designed such that LPWAN architecture, such as Zigbee standards and other similar LPWAN protocols, wirelessly link plural IoT sensors to an AP IoT server. As such, processing tasks, such as encryption or data format conversion, for most IoT sensor data that are to be conducted in preparation for transmission across public network links are conducted at the AP IoT server. However, common IoT sensor data processing tasks may be moved to orchestrating IoT gateway device information handling systems in an enterprise WAN to assist in reduction of IoT sensor data volume subsequent to the common processing tasks both between the AP IoT servers and orchestrating IoT gateway device information handling systems (AP-gateway side) and between the orchestrating IoT gateway device information handling system and a cloud computing platform (gateway-cloud side).

The amount or volume of IoT sensor data transmitted between any AP IoT server and an orchestrating IoT gateway device information handling system may depend upon the types of processing tasks executed at the AP IoT server prior to such transmission. For example, tasks that may be executed at an AP IoT server such as encryption or and conversion of unprocessed or raw IoT sensor data received from IoT sensors may increase the size of each encrypted or converted IoT sensor data file prior to its transmission from an AP IoT server to an orchestrating IoT gateway device information handling system in an enterprise WAN. In other words, IoT sensor data that has been processed in various ways by an AP IoT server may be larger than unprocessed IoT sensor data that is transmitted to the orchestrating IoT gateway device information handling system from the AP IoT server just as it was received from the IoT sensors.

Some forms of IoT sensor data processing tasks (e.g., encryption, formatting into predetermined data interchange formats such as JavaScript Notation (JSON)) may increase the size of the package that includes the underlying raw IoT sensor data by the same amount, regardless of the size of the underlying or as-yet unprocessed IoT sensor data. In other words, one way to decrease the size of IoT sensor data being transmitted between or among sensors and their AP IoT servers to orchestrating IoT gateway device information handling system in an enterprise WAN and from the orchestrating IoT gateway device information handling system to the cloud computing platform is to maximize the volume of underlying unprocessed IoT sensor data upon which a single IoT sensor data processing task (e.g., encryption, reformatting into JSON) is performed.

Because the NB-IoT standard LPWAN design and the enterprise WAN includes both AP IoT servers and at least one orchestrating IoT gateway device information handling system controlled by an enterprise and receiving IoT sensor data from a plurality of AP IoT servers, such IoT sensor data processing tasks may be performed at either the AP IoT servers or at the orchestrating IoT gateway device information handling system. In embodiments herein, the orchestrating IoT gateway device information handling system may receive IoT sensor data from a plurality of these AP IoT servers, and may thus have access to a larger pool of IoT sensor data than any one of these AP IoT servers by itself. This presents an opportunity to maximize the volume of underlying unprocessed IoT sensor data upon which a single IoT sensor data processing task is performed by performing that task upon this large pool of unprocessed IoT sensor data available at the orchestrating IoT gateway device, but not available in whole at any one of the AP IoT servers. By maximizing the volume of the underlying unprocessed IoT sensor data upon which a single IoT sensor data processing task is performed, the hardware processor of an orchestrating IoT gateway device information handling system executing code instructions of the $CO_2$ minimizing IoT edge gateway data processing orchestration system in embodiments of the present disclosure may decrease the size of IoT sensor data being transmitted between or among AP IoT servers and an orchestrating IoT gateway device information handling system in an enterprise WAN as well as decrease data transmitted by the orchestrating IoT gateway device information handling system across network links to the cloud computing platform.

The hardware processor of the orchestrating IoT gateway device information handling system executing code instructions of the $CO_2$ minimizing IoT edge gateway data processing orchestration system in embodiments of the present disclosure may identify common IoT sensor data processing tasks occurring at a plurality of different AP IoT sensors, and may transmit an instruction to each of the AP IoT servers currently executing the common data processing task to cease this execution. The AP IoT servers may further be instructed to begin transmitting future-collected unprocessed IoT sensor data to the orchestrating IoT gateway device information handling system for common processing tasks and transmission to the cloud computing platform. By executing the common data processing task in such a way at the orchestrating IoT gateway device information handling system on the unprocessed IoT sensor data received from a plurality of AP IoT servers, the hardware processor of the orchestrating IoT gateway device information handling system executing code instructions of the CO2 minimizing IoT edge gateway data processing orchestration system may minimize total CO2 emitted during the transfer of unprocessed IoT sensor data to the orchestrating IoT gateway device information handling system in the enterprise WAN as well as CO2 emitted to transmit IoT sensor data processed at the orchestrating IoT gateway device information handling system to a cloud computing platform through various servers and gateways a public network (e.g., the internet).

FIG. 1 illustrates an information handling system 100 according to several aspects of the present disclosure. As described herein, an information handling system 100 of an Internet of Things (IoT) gateway device may execute code instructions of a carbon dioxide (CO2) minimizing IoT edge gateway data processing orchestration system 180 to shift execution of IoT sensor data processing tasks commonly executed at a plurality of AP IoT servers (e.g., 130 or 140) to execute at the orchestrating IoT gateway device information handling system 100 to minimize power consumed and CO2 emitted during transceiving of data across an enterprise WAN.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory (RAM), dynamic RAM (DRAM), etc.), nonvolatile memory (read-only memory, flash memory, non-volatile RAM (NVRAM), etc.) or any combination thereof), one or more hardware processing resources, such as a central processing unit (CPU), a graphics processing unit (GPU), a Visual Processing Unit (VPU), a Hardware Accelerator, or controllers any one of which may be the hardware processor 101 illustrated in FIG. 1 or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit (PMU) 104 supplying power to the information handling system 100, via a battery 105 or an alternating current (A/C) power adapter 106 may supply power to one or more components of the information handling system 100, including the hardware processor 101, or other hardware processing resources executing code instructions of the CO2 minimizing IoT edge gateway data processing orchestration system 180, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the CO2 minimizing IoT edge gateway data processing orchestration system 180, that may operate on servers or systems, remote data centers, or on-box according to various embodiments herein. In some embodiments, it is understood any or all portions of code instructions 187 may operate on a plurality of information handling systems 100. The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system with processing resources executing code instructions of a CO2 minimizing IoT edge gateway data processing orchestration system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a low-power wide area network (LPWAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more AP IoT servers from an NB-IoT wireless network to an enterprise WAN with an orchestrating IoT gateway device information handling system 100 in an embodiment may be via wired or wireless connection. An enterprise WAN may be an enterprise-controlled network of an MNO or MVNO, for example, for operably connecting a plurality of facilities, such as data centers, for an enterprise. In some aspects of the present disclosure, the network interface device 160 may operate further with a public WAN or WWAN to a cloud computing platform 190. In other aspects of the present disclosure, the information handling system 100 may include a plurality of network interface devices, each capable of establishing a separate wireless link to network 170 or AP IoT servers 130, 140, such that the information handling system 100 may be in communication with network 170 as well as AP IoT servers 130, 140 and their NB-IoT neighborhoods of IoT sensors for transfer of IoT sensor data for an enterprise.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6c. It is understood that any number of available channels may be available in WLAN under the 2.4 GHZ, 5 GHZ, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHZ, also sometimes associated with 4G LTE and other standards predating the 5G communications standards. NRFR2 may include radio frequencies above 6 GHZ, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

The network interface device 160 in an embodiment may operably connect the information handling system 100 to one or more AP IoT servers (e.g., 130 or 140) via wired or wireless links. For example, in a first embodiment, the network interface device 160 may be operably connected so as to allow for the transfer of data between the AP IoT server 130 and the information handling system 100 via a wireless link, including over a WLAN, LPWAN, WWAN, or WPAN connection that may be part of an enterprise-administered MNO or MVNO in various embodiments. As another example, in a second embodiment, the network interface device 160 may be operably connected so as to allow for the transfer of data between the AP IoT server 140 and the information handling system 100 via a wired link, including over a LAN, WAN, or PAN connection, and particularly over a fiber-optic cable or fabric connection that may be part of an enterprise-administered MNO or MVNO in various embodiments. In another aspect of an embodiment, the network interface device 160 may be capable of transmitting instructions to a user interface 150 via the network 170. Such a user interface 150 may be a graphical user interface (GUI) of a user-controlled information handling system (e.g., computing device), a GUI of the orchestrating IoT gateway device information handling system 100, or any other type of user interface located either within the orchestrating IoT gateway device information handling system 100 or remotely therefrom, including an e-mail or instant messaging user interface assigned to a managing user of the orchestrating IoT gateway device information handling system 100. Transfer of certain common IoT sensor data processing tasks to the orchestrating IoT gateway device information handling system 100, as determined by the hardware processor 101 executing code instructions of the CO2 minimizing IoT edge gateway data processing orchestration system 180 in an embodiment may be transmitted to the user interface 150 as a recommendation or as a notification that the transfer has taken place in various embodiments herein. These instructions may recommend that the user approve a load-balancing instruction to shift execution of a common IoT sensor data processing task (e.g., encryption) from a plurality of AP IoT servers (e.g., 130 and 140) to the information handling system 100 of the orchestrating IoT gateway device information handling system.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing code instructions for systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed to identify and shift execution of a common IoT sensor data processing task (e.g., encryption) from a plurality of AP IoT servers (e.g., 130 and 140) to the orchestrating IoT gateway device information handling system 100 to reduce CO2 generation for IoT sensor data transfers among plural enterprise facilities to the backend enterprise applications operating at a cloud computing platform 190. For example, instructions 187 may include a particular example of a CO2 minimizing IoT edge gateway data processing orchestration system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The CO2 minimizing IoT edge gateway data processing orchestration system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the CO2 minimizing IoT edge gateway data processing orchestration system 180, firmware or software algorithms, processes, and/or methods may be stored here. The CO2 minimizing IoT edge gateway data processing orchestration system 180 may operate on hardware processing resources within an orchestrating IoT gateway device information handling system 100 that gathers operational telemetries from a plurality of operably connected AP IoT servers (e.g., 130, 140) that describe operating environments for those AP IoT servers (e.g., 130, 140) such as IoT sensor data volumes, processing tasks, and the like.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the CO2 minimizing IoT edge gateway data processing orchestration system 180 may be stored in static memory 103, or the drive unit 107 on a computer-readable medium 186 such as a flash memory or magnetic disk in an example embodiment. More specifically, operational telemetries for transfer or IoT sensor data to a backend cloud computing platform 190 via the orchestrating IoT gateway device information handling system 100 in the enterprise WAN describing power consumption, geographic locations, and data transfer volumes for a plurality of operably connected AP IoT servers (e.g., 130 and 140) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express (PCIe) card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, AMD® brand hardware processor, ARM® brand hardware processors, Qualcomm® brand hardware processors, or other hardware processors and chipsets, or other such device capable of operating a relevant environment of the information handling system. The hardware system, hardware device, hardware controller, or hardware module may also comprise a combination of the foregoing examples of hardware, hardware processors, or controllers executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
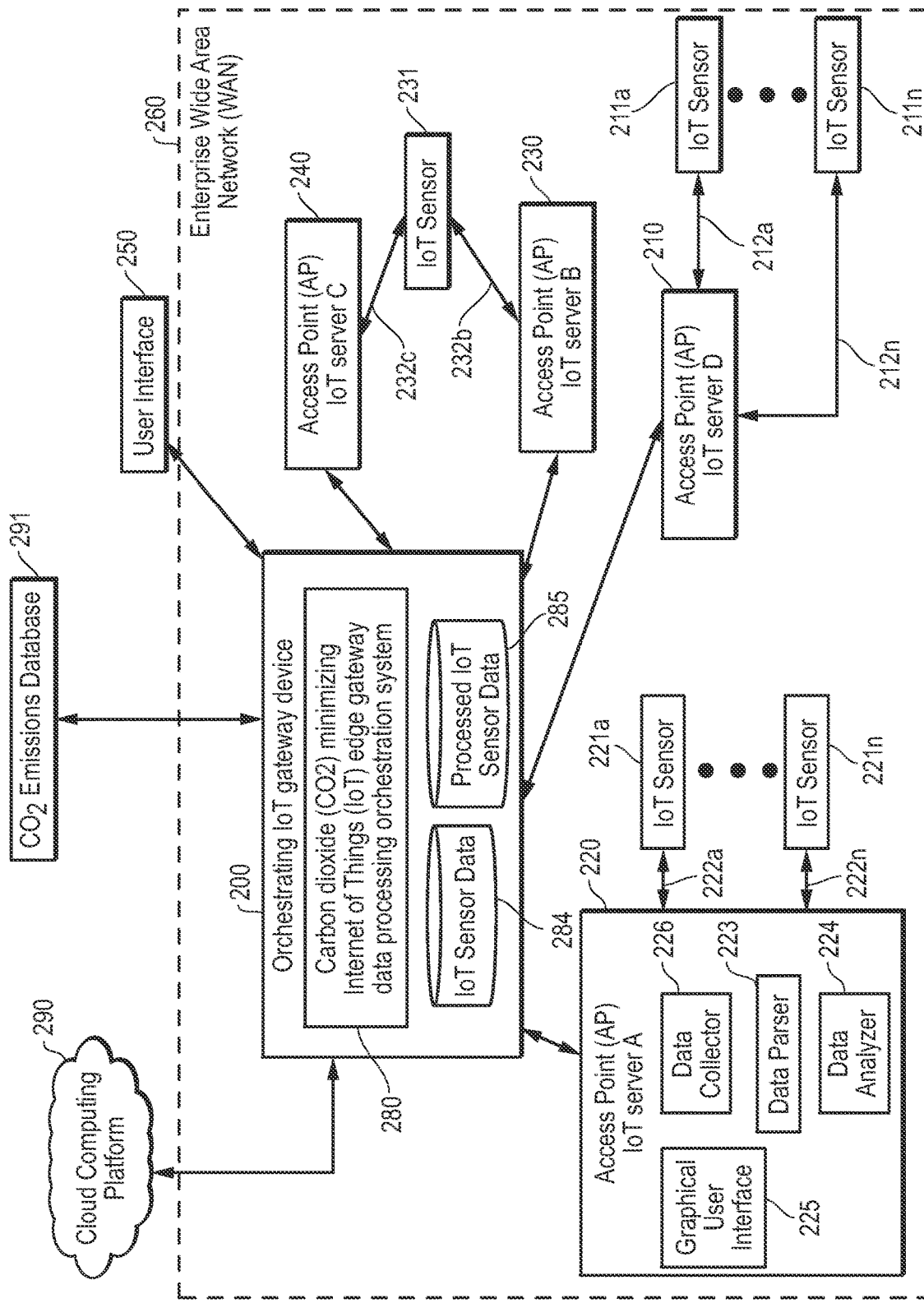
FIG. 2 is a block diagram illustrating an orchestrating IoT gateway device information handling system determining $CO_2$ emitted by a plurality of AP IoT servers transmitting IoT sensor data processed using a common data processing task according to an embodiment of the present disclosure.

FIG. 2 is a block diagram illustrating an orchestrating Internet of Things (IoT) gateway device information handling system gathering operational telemetries and processed IoT sensor data from a plurality of operably connected Access Point (AP) IoT servers within an enterprise wide area network (WAN) executing IoT sensor data processing tasks, including some common processing tasks, according to an embodiment of the present disclosure. As described herein, an enterprise WAN 260 may be an MNO or MVNO network in an embodiment that is owned or controlled by an enterprise to collect IoT sensor data from IoT sensors 211a-211n. 221a-221n, or 231 located a plural enterprise facilities for transfer to a backend enterprise application operating at a cloud computing platform 290 in an embodiment. In an embodiment, each of a plurality of AP IoT servers 210, 220, 230, or 240 may operate a neighborhood of LPWAN connected IoT sensors IoT sensors 211a-211n, 221a-221n, or 231 as shown in accordance with the 3GPP narrow band (NB) IoT data transmission standard. This enables devices to operate with existing private enterprise WANs such as MNOs to transfer IoT sensor data over potentially large distance ranges (e.g., akin to the wide area network (WAN) design of cellular technologies such as Global System for Mobile Communications (GSM) and Long Term Evolution (LTE)). An enterprise WAN 260 in an embodiment may include a plurality of Access Point (AP) IoT servers (e.g., 210, 220, 230, or 240), each collecting data from one or more IoT sensors (e.g., 211a-211n, 221a-221n, or 231) via respective NB-IoT LPWAN links (e.g., 212a-212n, 222a-222n, 232b and 232c). In order to cover potentially large areas while ensuring low power consumption of IoT sensors (e.g., 221a-221n, 211a-211n, and 231), NB-IoT is employed with the AP IoT servers to connect to the enterprise WAN and an orchestrating IoT gateway device information handling system 200. In an embodiment, a plurality of AP IoT servers (e.g., 210, 220, 230, or 240) within the enterprise WAN 260, such as an MNO or MVNO network, may transmit IoT sensor data to at least one orchestrating IoT gateway device information handling system 200. In other words, the AP IoT servers (e.g., 210, 220, 230, or 240) gather IoT sensor data from the IoT sensors (e.g., 221a to 221n, 211a to 211n, and 231) at various enterprise facilities and transfer it to the orchestrating IoT gateway device information handling system 200 which then transfers the IoT sensor data to a backend cloud computing platform in order to meet the requirements of extended coverage over a potentially large area. The operator of the enterprise WAN 260 may own or rent specific frequency ranges within existing cellular network frequency bands at which only the enterprise operator of the enterprise WAN 260 may transmit IoT sensor data or any other signals among the IoT sensors (e.g., 221a-221n. 211a-211n, and 231), the AP IoT servers (e.g., 210, 220, 230, or 240) and the orchestrating IoT gateway device information handling system 200. The orchestrating IoT gateway device information handling system 200 may then transmit IoT sensor data across public network, such as an internet or satellite connection, to the cloud computing platform 290 for an enterprise. Cloud computing platform 290 ma be a server or servers in the cloud executing software applications, such as facility monitoring software, using the IoT sensor data from various enterprise facilities.

As described herein, a hardware processor of an orchestrating IoT gateway device information handling system 200 executing code instructions of the carbon dioxide (CO2) minimizing IoT edge gateway data processing orchestration system 280 in an embodiment may minimize the total CO2 emitted during the transfer of IoT sensor data between a plurality of AP IoT servers (e.g., 210, 220, 230, 240) and orchestrating IoT gateway device information handling system 200 of an enterprise WAN 260 and a cloud computing platform 290 by shifting common data processing tasks. The common IoT sensor data processing tasks that may be executing at several of a plurality of AP IoT servers (e.g., 210, 220, 230, or 240) are shifted to execute at the orchestrating IoT gateway device information handling system 200 instead. Where it is determined that such a shift may conserve estimated CO2 emissions across the enterprise WAN 260 as a whole, those common processing tasks may be shifted from the plurality of AP IoT servers (e.g., 210, 220, 230, 240) to the orchestrating IoT gateway device information handling system 200 via issuing an instruction from the CO2 minimizing IoT edge gateway data processing orchestration system 280. In order to make such a determination, the orchestrating IoT gateway device information handling system 200 may collect information to determine current CO2 emissions as a result of IoT sensor data transmitted from the AP IoT servers (e.g., 210, 220, 230, and 240) to the orchestrating IoT gateway device information handling system 200, and from transmission to the cloud computing platform 290.

CO2 emitted by IoT sensor data transmission connections between such a plurality of AP IoT servers (e.g., 210, 220, 230, and 240) and any one of such orchestrating IoT gateway device information handling systems 200 within an enterprise WAN 260 network may be dependent upon power consumed during transceiving of IoT sensor data between the plurality of AP IoT servers (e.g., 210, 220, 230, or 240) and the orchestrating IoT gateway device information handling system 200, and between the orchestrating IoT gateway device information handling system 200 and the cloud computing platform 290. This may in turn be dependent on the amount or volume of IoT sensor data transmitted (e.g., in Gb), and the geographic locations of the AP IoT servers (e.g., 210, 220, 230, and 240) and the orchestrating IoT gateway device information handling system 200. For example, network distances and number of network hops among interim network equipment will affect power consumed and CO2 emitted to transfer the IoT sensor data.

In an embodiment, each AP IoT server (e.g., 210, 220, 230, or 240) may collect unprocessed IoT sensor data from one or more IoT sensors (e.g., 211a-211n, 221a-221n, or 231, respectively) via NB-IoT connections (e.g., 212a-212n, 222a-222n, or 232b and 232c, respectively), and perform at least one IoT sensor data processing task, such as encryption or conversion of the unprocessed IoT sensor data into a predetermined data interchange format (e.g., JavaScript Notation (JSON) or extensive markup language (XML)), to form processed IoT sensor data. For example, a data collector 226 of the AP IoT server A 220 may collect unprocessed sensor data from IoT sensors 221a to 221n and the data parser 223 may convert that unprocessed IoT sensor data into a JSON format, for example from the current LPWAN format (e.g., Zigbee or the like). The data parser 223 in an embodiment may operate to reformat any received unprocessed IoT sensor data into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

Such a JSON-formatted report or log may be referred to herein as a JSON event. Each JSON event may include any information gathered from the plurality of IoT sensors 221a to 221n with the respective NB-IoT links 222a-222n and a time stamp associated with the time of collection. In some cases, a JSON event may include routinely gathered information such as the types of data processing tasks performed on the received unprocessed IoT sensor data (e.g., encryption, compression, image processing, reformatting to the JSON standard) and power consumed during transmission of this IoT sensor data following execution of such IoT data processing tasks over a known monitoring time period. Such information may be illustrated by the following table:

TABLE 1

| | |
|---|---|
| AP IoT server ID | 123456 |
| Event ID | 456789 |
| Location | Austin, TX |
| Timestamp | 1655156447 |
| Unprocessed IoT Sensor Data volume | 100 GB; |
| Processing task executed | 256 bit advanced encryption standard (AES) |
| Volume of Data transmitted | 120 GB encrypted; |
| Power consumed during transmission 1 | 29,340 kWh |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID for a given transmission of IoT sensor data (e.g., either processed or unprocessed) from the AP IoT server 220 to the orchestrating IoT gateway device information handling system 200, a timestamp for that transmission, a volume of unprocessed IoT sensor data received at the AP IoT server 220 and transmitted during the identified transmission to the orchestrating IoT gateway device information handling system 200, the type of IoT sensor data processing task performed on the IoT sensor data at the AP IoT server 220 prior to transmission, and the volume of the processed IoT sensor data transmitted from the AP IoT server 220 to the orchestrating IoT gateway device information handling system 200. Any one of the rows of the JSON incident illustrated directly below may represent a JSON event. For example, such a data node depicting information from TABLE 1, above, may appear in a JSON incident as:

```
{
  "data" :
  {
    "AP_IoT_server_id" : 123456,
    "event_id" : 456789,
    "location" : Austin_TX,
    "timestamp_unixtime_ms" : 1544145336,
    "device_transmission_metrics" :
    {
      "Volume_unprocessed_IoT_sensor_data_received" : 100_GB,
      "Processing_task_executed" : 256_bit_AES,
      "Volume_processed_IoT_sensor_data_transmitted" : 120_GB,
      "Power_consumed_transmission" : 29340_kWh,
    }
  }
}
```

The example given above in TABLE 1 and the corresponding above JSON incident may further identify or describe all of the unprocessed IoT sensor data received by the AP IoT server 220 from the plurality of IoT sensors 221a to 221n. In other words, the information shown directly above may be appended to the unprocessed IoT sensor data received by the AP IoT server 220 as a header in some embodiments. Thus, by reformatting the unprocessed IoT sensor data into a JSON format (or any other type of predetermined data interchange format agreed upon between data sinks and sources), the size of the IoT sensor data to be transmitted may be greater than the size of the unprocessed IoT sensor data received from the IoT sensors 221a to 221n (e.g., by appending a header as shown directly above). As described herein, this is only one example of an IoT sensor data processing method or task that may increase the size of the IoT sensor data transmitted from the AP IoT server 220 to the orchestrating IoT gateway device information handling system 200. Other examples may include image processing tasks, or encryption.

Some of these IoT sensor data processing tasks may increase the size of the data transmitted by the same amount, regardless of the amount of IoT sensor data upon which that task is executed. For example, performance of a 256-bit encryption at the AP IoT server 200 may increase the size of the IoT sensor data from the 100 GB of unprocessed IoT sensor data received from the IoT sensors 221a to 221n, as reflected in the above JSON event and table 1, to the 120 GB of processed IoT sensor data transmitted to the orchestrating IoT gateway device information handling system 200 from the AP IoT server 220. Thus, a 256-bit encryption task may increase the size of the unprocessed IoT sensor data by 20 GB. This may also be the case when the encryption is performed on 500 GB of data. In other words, performance of a 256-bit encryption at the AP IoT server 220 may increase the size of the IoT sensor data from the 500 GB of unprocessed IoT sensor data received from the IoT sensors 221a to 221n, to 520 GB of processed IoT sensor data in preparation for transmission to the orchestrating IoT gateway device information handling system 200 from the AP IoT server 220 across the enterprise WAN.

As another example, conversion of unprocessed IoT sensor data to a JSON format in an embodiment at the AP IoT server 220 may increase the size of IoT sensor data from 500 GB of unprocessed IoT sensor data received from the IoT sensors 221a to 221n to 550 GB of processed IoT sensor data transmitted to the orchestrating IoT gateway device information handling system 200 from the AP IoT server 220 across the enterprise WAN. Thus, conversion of unprocessed IoT sensor data to a JSON format in an embodiment may increase the size of unprocessed IoT sensor data by 50 GB. This may also be the case when the JSON format conversion is performed on 1000 GB of data. As described herein, encryption and conversion to JSON, XML, or other predetermined data interchange formats agreed upon between data sinks and sources are two examples of IoT sensor data processing tasks known to increase the size of the IoT sensor data transmitted from the AP IoT server 220 to the orchestrating IoT gateway device information handling system 200 by a consistent or nearly consistent amount regardless of the size of the underlying unprocessed IoT sensor data. In current architecture for IoT sensor neighborhoods using NB-IoT connectivity, the AP IoT servers typically conduct such IoT sensor data processing tasks such as the above. Further, a plurality of AP IoT servers may be redundantly conducting similar IoT sensor data processing tasks that are common to some portion of the plurality of AP IoT servers in an enterprise WAN.

Upon reformatting of information in an embodiment, the data parser 223 may transmit the JSON incident to the data analyzer 224. In an embodiment, the data analyzer 224 may operate to analyze the contents of the JSON incident, to classify the type of processed IoT sensor data and processing tasks reflected in the JSON events, and to edit the JSON incident to generate a second JSON incident that includes that IoT sensor data processing task classification type. IoT sensor data processing task classification types may be preset according to instructions received from the CO2 minimizing IoT edge gateway data processing orchestration system 280. Such IoT sensor data processing task classification types may assist the CO2 minimizing IoT edge gateway data processing orchestration system 280 in determining recommendations to shift execution of common IoT sensor data processing tasks currently executing at a plurality of AP IoT servers (e.g., 220 and 210) to execute at the orchestrating IoT gateway device information handling system 200 instead. This may be beneficial in the case where the IoT sensor data processing task listed within the JSON incident is known to increase the size of the processed IoT sensor data by the same amount, regardless of the size of the underlying unprocessed IoT sensor data (e.g., as described directly above with respect to encryption tasks). Thus, the CO2 minimizing IoT edge gateway data processing orchestration system 280 may have preset a classification type "candidate_processing_task" to identify specific processing tasks that increase the size of the processed IoT sensor data by the same or a nearly consistent amount, regardless of the size of the underlying unprocessed IoT sensor data as candidates for offloading the common IoT sensor data processing tasks from the plurality of AP IoT servers (e.g., 210 and 220) to the orchestrating IoT gateway device information handling system 200 in an enterprise WAN.

The CO2 minimizing IoT edge gateway data processing orchestration system 280 may make recommendations based on commonality of IoT sensor data processing tasks performed across a plurality of AP IoT servers (e.g., 210 and 220). Thus, each of these IoT sensor data processing task types may be associated with a separate preset classification type (e.g., encryption, JSON_conversion, XML_conversion) known to establish the identified IoT sensor data processing task as a candidate for offloading to the orchestrating IoT gateway device information handling system 200. In an example embodiment, the data analyzer 224 in an embodiment may analyze the JSON incident described above to identify whether any of the JSON events and values associated with preset incident IoT sensor data processing task classifications appear within the JSON incident. For example, the data analyzer 242 in an embodiment may determine the JSON incident described above includes the JSON event named "encryption," having a value of "256_bit_SAE," and identify "encryption" as one of the preset classification types associated with IoT sensor data processing tasks known to increase the size of the processed IoT sensor data by the same amount, regardless of the size of the underlying unprocessed IoT sensor data. The data analyzer 224 in an embodiment may apply the "encryption" classification by editing the JSON incident received from the data parser 223 to generate a classified JSON incident that includes the following incident classification, in addition to the data nodes described above, within the JSON incident:

```
{
    "Candidate_processing_task" : encryption,
}
```

This classification may be appended to the end of the header described directly above, as generated with respect to Table 1. The full JSON incident, including the full header and all of the underlying unprocessed IoT sensor data in an embodiment may then be transmitted to the orchestrating IoT gateway device information handling system 200. Other IoT sensor data processing tasks may be different or not common based on IoT sensor data processing task classification. For example, in some embodiments, a different encryption may be used by some AP IoT servers per specification such as 128 bit encryption. The IoT sensor data processing task classification indicator in the JSON incidents may have a distinguishing classifier identifying types of encryption in such an example. This process of JSON incident creation and classification may be repeated at each of the AP IoT servers 210, 230, and 240 in an example embodiment.

In an embodiment, the orchestrating IoT gateway device information handling system 200 may receive such JSON incidents from a plurality of AP IoT servers, including 220, 210, 240, and 240 and store them within the processed IoT sensor data 285. Each of these AP IoT servers 210, 220, 230, and 240 may be collecting unprocessed IoT sensor data from a plurality of different types of IoT sensors (e.g., 211a-211n, 221a-221n, and 231, respectively) via their NB-IoT neighborhoods. In addition, some of these AP IoT servers 210, 220, 230, and 240 may perform the same types of IoT sensor data processing tasks (e.g., encryption, image processing, or conversion to JSON) as other AP IoT servers. For example, AP IoT server A 220 and AP IoT server D 210 may both be performing the same type of encryption task on unprocessed IoT sensor data received from the IoT sensors 221a to 221n and 211a to 211n, respectively, as indicated by classification type "encryption" included within the JSON incidents generated at each of the AP IoT servers 210 and 220 and transmitted to the CO2 minimizing IoT edge gateway data processing orchestration system 280.

In other embodiments, a plurality of AP IoT servers (e.g., 210 and 230) may be performing the same type of IoT sensor data processing task, such as image processing, but that particular task may not be determined by the CO2 minimizing IoT edge gateway data processing orchestration system 280 as a candidate processing task for offloading. This may be the case because image processing tasks increase the size of the processed IoT sensor data as the size of the underlying unprocessed IoT sensor data also increases. Thus, offloading of such a task to the orchestrating IoT gateway device information handling system 200 may not provide the same CO2 savings benefit as offloading of encryption and JSON conversion tasks. In such a scenario, the JSON incident for the image processing task may not include a classification type indicating the image processing task as a candidate for offloading.

Over a testing period, each of the AP IoT servers (e.g., 210, 220, 230, or 240) may transmit these converted files to the orchestrating IoT gateway device information handling system 200, including the size of the underlying IoT sensor data, along with power consumption metrics describing the amount of power consumed by the AP IoT servers (e.g., 210, 220, 230, and 240) during transmission of these converted files to the orchestrating IoT gateway device information handling system 200 in the enterprise WAN. Each of the converted files received from individual AP IoT servers (e.g., 210, 220, 230, 240) at the orchestrating IoT gateway device information handling system 200 may then be transmitted individually to the cloud computing platform 290 for use by an enterprise backend software application executing at the cloud computing platform 290.

The orchestrating IoT gateway device information handling system 200 may determine CO2 emissions due to transmission of processed IoT sensor data from a plurality of AP IoT servers executing common IoT sensor data processing tasks according to an embodiment of the present disclosure. The hardware processor of an orchestrating IoT gateway device information handling system 200 executing code instructions of the CO2 minimizing IoT edge gateway data processing orchestration system 280 in an embodiment may receive the processed IoT sensor data and its identifying classified JSON incidents (or classified and converted IoT sensor data in another format such as XML) from a plurality of AP IoT servers (e.g., 210, 220, 230, and 240). The hardware processor executing code instructions of the CO2 minimizing IoT edge gateway data processing orchestration system 280 may store such received processed IoT sensor data within a processed IoT sensor data pool 285 along with identifying classified JSON incidents. This received pool 285 of processed IoT sensor data may then be analyzed to identify one or more common data processing tasks being performed at a plurality of the AP IoT servers (e.g., 210 and 220).

For example, the hardware processor of the orchestrating IoT gateway device information handling system 200 executing code instructions of the CO2 minimizing IoT edge gateway data processing orchestration system 280 in an embodiment may search the processed IoT sensor data in data pool 285 to identify a plurality of JSON incidents having the classification "candidate_processing_task," and a value of "encryption." In another example, the hardware processor of the orchestrating IoT gateway device information handling system 200 executing code instructions of the CO2 minimizing IoT edge gateway data processing orchestration system 280 may search the processed IoT sensor data in data storage pool 285 to identify a plurality of JSON incidents having the classification "candidate_processing_task." and a value of "JSON_conversion." In either of these example embodiments, the hardware processor of the orchestrating IoT gateway device information handling system 200 executing code instructions of the CO2 minimizing IoT edge gateway data processing orchestration system 280 may identify each of these JSON incidents as sharing a common candidate processing task (e.g., encryption or JSON conversion). In some cases, the hardware processor of the orchestrating IoT gateway device information handling system 200 executing code instructions of the CO2 minimizing IoT edge gateway data processing orchestration system 280 may only confirm commonality of the candidate processing task with reference to the type of encryption for other IoT sensor data processing task. For example, the hardware processor of the orchestrating IoT gateway device information handling system 200 executing code instructions of the CO2 minimizing IoT edge gateway data processing orchestration system 280 in an embodiment where a plurality of JSON incidents include the classification "candidate_processing_task," and a value of "encryption" may only identify the plurality of JSON incidents as true candidates when the encryption type (e.g., 256_bit_SAE) given within the JSON incidents match one another. For example, other types of encryptions for 128 bit or 512 bit encryptions may not match.

Upon identifying a plurality of JSON incidents having the same classification type, or meeting further requirements for identification as a candidate common IoT sensor data processing task, as described directly above, the hardware processor of the orchestrating IoT gateway device information handling system 200 executing code instructions of the CO2 minimizing IoT edge gateway data processing orchestration system 280 may determine that the plurality of JSON incidents were received from different AP IoT servers (e.g., 210 and 220). For example, the hardware processor of the orchestrating IoT gateway device information handling system 200 executing code instructions of the CO2 minimizing IoT edge gateway data processing orchestration system 280 in an embodiment may determine that a portion of the plurality of JSON incidents that include the classification "candidate_processing_task," having a value of "JSON_conversion" were generated at AP IoT server A 220 and a portion were generated at AP IoT server D 210. In another example, the CO2 minimizing IoT edge gateway data processing orchestration system 280 in an embodiment may determine that a portion of the plurality of JSON incidents that include the classification "candidate_processing_task," having a value of "encryption" were generated at AP IoT server A 220 and a portion were generated at AP IoT server D 210. In still another example, the CO2 minimizing IoT edge gateway data processing orchestration system 280 in an embodiment may determine that a portion of the plurality of JSON incidents that include the classification "candidate_processing_task," having a value of "encryption," and include the JSON event "encryption," having a value of "256_bit_SAE" were generated at AP IoT server A 220 and a portion were generated at AP IoT server D 210. Each of these JSON incidents in an embodiment may be identified by the CO2 minimizing IoT edge gateway data processing orchestration system 280 in an embodiment as candidate offload common IoT sensor data processing tasks identified in JSON incidents.

The hardware processor of the orchestrating IoT gateway device information handling system executing code instructions of the CO2 minimizing IoT edge gateway data processing orchestration system 280 in an embodiment may determine the amount of CO2 emitted due to power consumed during transmission of the processed IoT sensor data from the AP IoT servers (e.g., 210 and 220) for the candidate offload common IoT sensor data processing tasks identified in JSON incidents (e.g., encryption, JSON conversion) to the orchestrating IoT gateway device information handling system 200. For example, the CO2 minimizing IoT edge gateway data processing orchestration system 280 in an embodiment may refer to the CO2 emissions database 291 to determine an amount of CO2 emitted per kWh of power consumed at the geographic location of each of the AP IoT servers (e.g., 210 and 220), as shown within the candidate offload common IoT sensor data processing tasks identified in JSON incidents. The CO2 minimizing IoT edge gateway data processing orchestration system 280 in an embodiment may then multiply this value of CO2 weight (e.g., in lbs, tons, kgs) per kWh by the power consumed during transmission of the processed IoT sensor data (e.g., in kWh) which include the candidate offload common IoT sensor data processing tasks identified in JSON incidents.

For example, the hardware processor of the orchestrating IoT gateway device information handling system 200 executing code instructions of the CO2 minimizing IoT edge gateway data processing orchestration system 280 may determine the AP IoT server A 220 caused 24,000 pounds or 12 tons of CO2 to be emitted during the transmission of 120 GB of processed IoT sensor data to the orchestrating IoT gateway device information handling system 200, due to the consumption of 48,000 kWh of power in Austin, TX, where the power supplier generates 0.5 pounds of CO2 per kWh generated. As another example, the CO2 minimizing IoT edge gateway data processing orchestration system 280 may determine the AP IoT server A 220 caused roughly 110,000 pounds or 55 tons of CO2 to be emitted during the transmission of 550 GB of processed IoT sensor data to the orchestrating IoT gateway device information handling system 200, due to the consumption of 220,000 kWh of power in Austin, TX, where the power supplier generates 0.5 pounds of CO2 per kWh generated.

In yet another example, the hardware processor of the orchestrating IoT gateway device information handling system 200 executing code instructions of the CO2 minimizing IoT edge gateway data processing orchestration system 280 may determine the AP IoT server D 210 caused 135,000 pounds or 67.6 tons of CO2 to be emitted during the transmission of 520 GB of processed IoT sensor data to the orchestrating IoT gateway device information handling system 200, due to the consumption of 225.333 kWh of power in Denver, CO, where the power supplier generates 0.6 pounds of CO2 per kWh generated. As another example, the CO2 minimizing IoT edge gateway data processing orchestration system 280 may determine the AP IoT server D 210 caused 39,000 pounds or 19.5 tons of CO2 to be emitted during the transmission of 150 GB of processed IoT sensor data to the orchestrating IoT gateway device information handling system 200, due to the consumption of 65,000 kWh of power in Denver, CO, where the power supplier generates 0.6 pounds of CO2 per kWh generated.

A determination may also be made for the amount of CO2 emitted due to power consumed at the orchestrating IoT gateway device information handling system 200 during transmission of the processed IoT sensor data received at the orchestrating IoT gateway device information handling system 200 and transmitted to the cloud computing platform via the public network links. For example, the hardware processor of the orchestrating IoT gateway device information handling system 200 executing code instructions of the CO2 minimizing IoT edge gateway data processing orchestration system 280 may determine that transmission of the 120 GB of processed IoT sensor data received from AP IoT server A 220 at the orchestrating IoT gateway device information handling system 200 and transmitted to the cloud computing platform 290 consumed 17,143 kWh of power at the location of the CO2 minimizing IoT edge gateway data processing orchestration system 280 in Dallas, TX, where power stations cause an average of 0.7 pounds of CO2 per kWh, to cause CO2 emissions of 12,000 pounds or 6 tons. As another example, the CO2 minimizing IoT edge gateway data processing orchestration system 280 may determine that transmission of the 550 GB of processed IoT sensor data received from AP IoT server A 220 at the orchestrating IoT gateway device information handling system 200 and transmitted to the cloud computing platform 290 consumed 78,571 kWh of power at the location of the CO2 minimizing IoT edge gateway data processing orchestration system 280 in Dallas, TX, where power stations cause an average of 0.7 pounds of CO2 per kWh, to cause CO2 emissions of 55,000 pounds or 27.5 tons. As yet another example, the CO2 minimizing IoT edge gateway data processing orchestration system 280 may determine that transmission of the 520 GB of processed IoT sensor data received from AP IoT server D 210 at the orchestrating IoT gateway device information handling system 200 and transmitted to the cloud computing platform 290 consumed 74,286 kWh of power at the location of the CO2 minimizing IoT edge gateway data processing orchestration system 280 in Dallas, TX, where power stations cause an average of 0.7 pounds of CO2 per kWh, to cause CO2 emissions of 52,000 pounds or 26 tons. In still another example, the CO2 minimizing IoT edge gateway data processing orchestration system 280 may determine that transmission of the 150 GB of processed IoT sensor data received from AP IoT server D 210 at the orchestrating IoT gateway device information handling system 200 and transmitted to the cloud computing platform 290 consumed 21,429 kWh of power at the location of the CO2 minimizing IoT edge gateway data processing orchestration system 280 in Dallas, TX, where power stations cause an average of 0.7 pounds of CO2 per kWh, to cause CO2 emissions of 15,000 pounds or 7.5 tons.

In an embodiment, the hardware processor of the orchestrating IoT gateway device information handling system 200 executing code instructions of the CO2 minimizing IoT edge gateway data processing orchestration system 280 may determine a total initial CO2 emissions that resulted from transmission of each of the candidate offload common IoT sensor data processing tasks identified with JSON incidents from the AP IoT servers (e.g., 210 and 220) to the orchestrating IoT gateway device information handling system 200 and then transmission of processed IoT sensor data to the cloud computing platform 290. For example, in an embodiment in which the common IoT sensor data processing task is encryption, the hardware processor of the orchestrating IoT gateway device information handling system 200 executing code instructions of the CO2 minimizing IoT edge gateway data processing orchestration system 280 may determine that transmission of the encrypted IoT sensor data to the orchestrating IoT gateway device information handling system 200 caused CO2 emissions of 12 tons at AP IoT A server 220, 67.6 tons at AP IoT server D 210, and 32 tons at the orchestrating IoT gateway device information handling system 200 transmission to the cloud computing platform 290, for a total initial CO2 emissions value of 111.6 tons. As another example, in an embodiment in which the common IoT sensor data processing task is conversion to JSON, the hardware processor of the orchestrating IoT gateway device information handling system 200 executing code instructions of the CO2 minimizing IoT edge gateway data processing orchestration system 280 may determine that transmission of the JSON converted IoT sensor data to the orchestrating IoT gateway device information handling system 200 caused CO2 emissions of 55 tons at AP IoT A server 220, 19.5 tons at AP IoT server D 210, and 35 tons at the orchestrating IoT gateway device information handling system 200 for transmission to the cloud computing platform 290, for a total initial CO2 emissions value of 109.5 tons.

The hardware processor of the orchestrating IoT gateway device information handling system 200 executing code instructions of the CO2 minimizing IoT edge gateway data processing orchestration system 280 in an embodiment may also estimate CO2 that would be emitted if each of the AP IoT servers executing the common data processing task were to transmit the unprocessed IoT sensor data, as received from a plurality of IoT sensors via NB-IoT neighborhoods. For example, the hardware processor of the orchestrating IoT gateway device information handling system 200 executing code instructions of the CO2 minimizing IoT edge gateway data processing orchestration system 280 may determine, for each of the AP IoT servers (e.g., 210 and 220) associated with candidate offload common IoT sensor data processing tasks identified with JSON incidents, an amount of CO2 emitted per unit of unprocessed IoT sensor data transmitted. More specifically, the hardware processor of the orchestrating IoT gateway device information handling system 200 executing code instructions of the CO2 minimizing IoT edge gateway data processing orchestration system 280 in an embodiment in which the candidate offload common IoT sensor data processing tasks identified with JSON incident identifies the common IoT sensor data processing task of encryption may determine that transmission of 120 GB of encrypted IoT sensor data from AP IoT server A 220 to the orchestrating IoT gateway device information handling system 200 caused 12 tons of CO2 emissions, at a rate of 0.1 tons of $CO_2$ per GB transmitted. In another example embodiment, the hardware processor of the orchestrating IoT gateway device information handling system 200 executing code instructions of the $CO_2$ minimizing IoT edge gateway data processing orchestration system 280 in an embodiment in which the candidate offload common IoT sensor data processing tasks identified with JSON incident identifies the common IoT sensor data processing task of conversion to JSON may determine that transmission of 150 GB of processed IoT sensor data in the form of a JSON incident from AP IoT server D 210 to the orchestrating IoT gateway device information handling system 200 caused 19.5 tons of $CO_2$ emissions, at a rate of 0.13 tons of $CO_2$ per GB transmitted. In yet another example embodiment, the hardware processor of the orchestrating IoT gateway device information handling system 200 executing code instructions of the $CO_2$ minimizing IoT edge gateway data processing orchestration system 280 in an embodiment in which the candidate offload common IoT sensor data processing tasks identified with the JSON incident identifies the common IoT sensor data processing task of encryption may determine that transmission of 120 GB of encrypted IoT sensor data (i.e., processed) from the orchestrating IoT gateway device information handling system 200 to the cloud computing platform 290 caused 6 tons of $CO_2$ emissions, at a rate of 0.05 tons of $CO_2$ per GB transmitted. These levels of $CO_2$ emissions from transmission of processed IoT sensor data may be then compared to estimates of unprocessed IoT sensor data transmission amounts to determine estimated $CO_2$ levels for unprocessed IoT sensor data transmission in the enterprise WAN.

In particular, the hardware processor of the orchestrating IoT gateway device information handling system 200 executing code instructions of the $CO_2$ minimizing IoT edge gateway data processing orchestration system 280 in an embodiment may then multiply this $CO_2$ per GB rate by the volume of unprocessed IoT sensor data received at the respective AP IoT servers (e.g., 210 and 220), prior to execution at those AP IoT servers (e.g., 210 and 220) of the common IoT sensor data processing task (e.g., encryption or conversion to JSON). For example, the hardware processor of the orchestrating IoT gateway device information handling system 200 executing code instructions of the $CO_2$ minimizing IoT edge gateway data processing orchestration system 280 may multiply the 0.1 tons of $CO_2$ per GB rate determined for AP IoT server A 220 by the 100 GB volume of unprocessed IoT sensor data upon which the AP IoT server A 220 will have performed the common encryption task. In such a way, the hardware processor of the orchestrating IoT gateway device information handling system 200 executing code instructions of the $CO_2$ minimizing IoT edge gateway data processing orchestration system 280 may estimate that the AP IoT server A 220 would have caused the emission of 10 tons of $CO_2$ by transmitting the unprocessed IoT sensor data prior to execution of the common encryption task to the orchestrating IoT gateway device information handling system 200.

As another example, the hardware processor of the orchestrating IoT gateway device information handling system 200 executing code instructions of the $CO_2$ minimizing IoT edge gateway data processing orchestration system 280 may multiply the 0.1 tons of $CO_2$ per GB rate determined for AP IoT server A 220 by the 500 GB volume of unprocessed IoT sensor data upon which the AP IoT server A will have performed the common JSON conversion task. In such a way, the hardware processor of the orchestrating IoT gateway device information handling system 200 executing code instructions of the $CO_2$ minimizing IoT edge gateway data processing orchestration system 280 may estimate that the AP IoT server A 220 would have caused the emission of 50 tons of $CO_2$ by transmitting the unprocessed IoT sensor data prior to execution of the common JSON conversion task to the orchestrating IoT gateway device information handling system 200.

In yet another example, the hardware processor of the orchestrating IoT gateway device information handling system 200 executing code instructions of the $CO_2$ minimizing IoT edge gateway data processing orchestration system 280 may multiply the 0.13 tons of $CO_2$ per GB rate determined for AP IoT server D 210 by the 500 GB volume of unprocessed IoT sensor data upon which the AP IoT server D 210 will have performed the common encryption task. In such a way, the hardware processor of the orchestrating IoT gateway device information handling system 200 executing code instructions of the $CO_2$ minimizing IoT edge gateway data processing orchestration system 280 may estimate that the AP IoT server D 210 would have caused the emission of 65 tons of $CO_2$ by transmitting the unprocessed IoT sensor data prior to execution of the common encryption task to the orchestrating IoT gateway device information handling system 200. In still another example, the hardware processor of the orchestrating IoT gateway device information handling system 200 executing code instructions of the $CO_2$ minimizing IoT edge gateway data processing orchestration system 280 may multiply the 0.13 tons of $CO_2$ per GB rate determined for AP IoT server D 210 by the 100 GB volume of unprocessed IoT sensor data upon which the AP IoT server D 210 will have performed the common JSON conversion task. In such a way, the hardware processor of the orchestrating IoT gateway device information handling system 200 executing code instructions of the $CO_2$ minimizing IoT edge gateway data processing orchestration system 280 may estimate that the AP IoT server D 210 would have caused the emission of 13 tons of $CO_2$ by transmitting the unprocessed IoT sensor data prior to execution of the common JSON conversion task to the orchestrating IoT gateway device information handling system 200.

The hardware processor of the orchestrating IoT gateway device information handling system 200 executing code instructions of the $CO_2$ minimizing IoT edge gateway data processing orchestration system 280 in an embodiment may also estimate $CO_2$ that would be emitted during transfer of processed IoT sensor data from the orchestrating IoT gateway device information handling system 200 to the cloud computing platform 290 in the case where the orchestrating IoT gateway device information handling system 200 performs the common data processing task compared to the case where the plural AP IoT servers perform the common IoT sensor data processing task. In such a scenario, the orchestrating IoT gateway device information handling system 200 may perform such a common IoT sensor data processing task (e.g., encryption or conversion to JSON) on a larger volume of data than either of the AP IoT servers (e.g., 210 and 220) can access individually. As described above, in the case where each AP IoT server (e.g., 210 and 220) individually executes the common data processing task (e.g., encryption or conversion to JSON), a separate processed IoT sensor data file for each AP IoT servers (e.g., 210 or 220) from which such processed IoT sensor data has been received at the orchestrating IoT gateway device information handling system 200 may be transmitted separately to the cloud computing platform 290. In the case where the orchestrating IoT gateway device information handling system 200 performs such a common data processing task instead, the orchestrating IoT gateway device information handling system 200 may pool all of the unprocessed IoT sensor data received from each of these AP IoT servers (e.g., 210 or 220) and perform the common data processing method on this large pool of IoT sensor data at one time. This may yield savings of processing overhead associated with the common IoT sensor data processing task being executed at several of a plurality of AP IoT servers in the enterprise WAN.

For example, in an embodiment in which the common IoT sensor data processing task is encryption, the hardware processor of the orchestrating IoT gateway device information handling system 200 executing code instructions of the $CO_2$ minimizing IoT edge gateway data processing orchestration system 280 may estimate the size of the encrypted IoT sensor data that may be generated if the encryption task were performed at the orchestrating IoT gateway device information handling system 200 on the 100 GB of unprocessed IoT sensor data collected at the AP IoT server A 220 and the 500 GB of unprocessed IoT sensor data collected at the AP IoT server D 210. The hardware processor of the orchestrating IoT gateway device information handling system 200 executing code instructions of the $CO_2$ minimizing IoT edge gateway data processing orchestration system 280 may first determine a margin by which the encryption task increased the underlying unprocessed IoT sensor data volume at either of the AP IoT servers (e.g., 210 or 220) that previously executed this task. For example, the hardware processor of the orchestrating IoT gateway device information handling system 200 executing code instructions of the $CO_2$ minimizing IoT edge gateway data processing orchestration system 280 may determine that encryption at the IoT server A 220 increased the volume of the unprocessed IoT sensor data from 100 GB to 120 GB, or by a margin of 20 GB. As another example, the hardware processor of the orchestrating IoT gateway device information handling system 200 executing code instructions of the $CO_2$ minimizing IoT edge gateway data processing orchestration system 280 may determine that encryption at the IoT server D 210 increased the volume of the unprocessed IoT sensor data from 500 GB to 520 GB, or by a margin of 20 GB. In some cases, the margin determined for one of the AP IoT servers may not match the margin of the other AP IoT server(s). In such a case, the hardware processor of the orchestrating IoT gateway device information handling system 200 executing code instructions of the $CO_2$ minimizing IoT edge gateway data processing orchestration system 280 may assume a global margin equivalent to the highest margin determined across all AP IoT servers in some example embodiments.

The hardware processor of the orchestrating IoT gateway device information handling system 200 executing code instructions of the $CO_2$ minimizing IoT edge gateway data processing orchestration system 280 may then estimate the size of the encrypted IoT sensor data that would be generated if the encryption task were executed at the orchestrating IoT gateway device information handling system 200. For example, by adding this same margin of processing task overhead to the sum of the unprocessed IoT sensor data received from all AP IoT servers (e.g., 210 and 220) identified as previously executing the common encryption task, a size of encrypted IoT sensor data for transmission to the cloud may be estimated. For example, the hardware processor of the orchestrating IoT gateway device information handling system 200 executing code instructions of the $CO_2$ minimizing IoT edge gateway data processing orchestration system 280 may estimate that the orchestrating IoT gateway device information handling system 200 executing the common encryption task on the 100 GB of unprocessed IoT sensor data received from AP IoT server A 220 and the 500 GB of unprocessed IoT sensor data received from AP IoT server D 210, simultaneously, would generate a volume of 620 GB for transmission to the cloud computing platform 290.

As another example, in an embodiment in which the common IoT sensor data processing task is conversion to JSON, the hardware processor of the orchestrating IoT gateway device information handling system 200 executing code instructions of the $CO_2$ minimizing IoT edge gateway data processing orchestration system 280 may estimate the size of the JSON processed IoT sensor data that may be generated if the JSON conversion task were performed at the orchestrating IoT gateway device information handling system 200 on the 500 GB of unprocessed IoT sensor data collected at the AP IoT server A 220 and the 100 GB of unprocessed IoT sensor data collected at the AP IoT server D 210. The hardware processor of the orchestrating IoT gateway device information handling system 200 executing code instructions of the $CO_2$ minimizing IoT edge gateway data processing orchestration system 280 may first determine a margin by which the JSON conversion task increased the underlying unprocessed IoT sensor data volume at either of the AP IoT servers (e.g., 210 or 220) that previously executed this task. For example, the hardware processor of the orchestrating IoT gateway device information handling system 200 executing code instructions of the $CO_2$ minimizing IoT edge gateway data processing orchestration system 280 may determine that conversion to JSON at the IoT server A 220 increased the volume of the unprocessed IoT sensor data from 500 GB to 550 GB, or by a margin of 50 GB. As another example, the hardware processor of the orchestrating IoT gateway device information handling system 200 executing code instructions of the $CO_2$ minimizing IoT edge gateway data processing orchestration system 280 may determine that conversion to JSON at the IoT server D 210 increased the volume of the unprocessed IoT sensor data from 100 GB to 150 GB, or by a margin of 50 GB.

The hardware processor of the orchestrating IoT gateway device information handling system 200 executing code instructions of the $CO_2$ minimizing IoT edge gateway data processing orchestration system 280 may then estimate the size of the JSON processed IoT sensor data that would be generated if the JSON conversion task were executed at the orchestrating IoT gateway device information handling system 200 by adding this same margin to the sum of the unprocessed IoT sensor data received from all AP IoT servers (e.g., 210 and 220) identified as previously executing the common JSON conversion task. For example, the hardware processor of the orchestrating IoT gateway device information handling system 200 executing code instructions of the $CO_2$ minimizing IoT edge gateway data processing orchestration system 280 may estimate that the orchestrating IoT gateway device information handling system 200 executing the common JSON conversion task on the 500 GB of unprocessed IoT sensor data received from AP IoT server A 220 and the 100 GB of unprocessed IoT sensor data received from AP IoT server D 210, simultaneously, would generate a volume of 650 GB of JSON processed IoT sensor data for transmission to the cloud computing platform 290.

In an embodiment, the hardware processor of the orchestrating IoT gateway device information handling system 200 executing code instructions of the $CO_2$ minimizing IoT edge gateway data processing orchestration system 280 may then estimate an amount of CO2 that would be emitted during transmission to the cloud computing platform 290 of the estimated volume of data generated during execution of the common IoT sensor data processing task at the orchestrating IoT gateway device information handling system 200. For example, the hardware processor of the orchestrating IoT gateway device information handling system 200 executing code instructions of the CO2 minimizing IoT edge gateway data processing orchestration system 280 may estimate that transmission of 620 GB of encrypted IoT sensor data from the orchestrating IoT gateway device information handling system 200 to the cloud computing platform 290 at a rate (e.g., as determined above) of 0.05 tons of CO2 per GB transmitted may result in the emission of 31 tons of CO2. As another example, the hardware processor of the orchestrating IoT gateway device information handling system 200 executing code instructions of the CO2 minimizing IoT edge gateway data processing orchestration system 280 may estimate that transmission of a 650 GB of JSON processed IoT sensor data from the orchestrating IoT gateway device information handling system 200 to the cloud computing platform 290 at a rate (e.g., as determined above) of 0.05 tons of CO2 per GB transmitted may result in the emission of 32.5 tons of CO2.

The hardware processor of the orchestrating IoT gateway device information handling system 200 executing code instructions of the CO2 minimizing IoT edge gateway data processing orchestration system 280 may thus estimate a total amount of CO2 that would be emitted if the common IoT sensor data processing task were shifted to the orchestrating IoT gateway device information handling system 200. For example, the hardware processor of the orchestrating IoT gateway device information handling system 200 executing code instructions of the CO2 minimizing IoT edge gateway data processing orchestration system 280 in an embodiment in which the common IoT sensor data processing task is encryption may estimate that shifting execution of the encryption task to the orchestrating IoT gateway device information handling system 200 may result in 10 tons of CO2 being emitted during transmission of unprocessed IoT sensor data from AP IoT server A 220, 65 tons of CO2 being emitted during transmission of unprocessed IoT sensor data from AP IoT server D 210, and 31 tons of CO2 being emitted during transmission of the encrypted IoT sensor data from the orchestrating IoT gateway device information handling system 200 to the cloud computing platform 290, for a total of 106 tons of CO2. As another example, the hardware processor of the orchestrating IoT gateway device information handling system 200 executing code instructions of the CO2 minimizing IoT edge gateway data processing orchestration system 280 in an embodiment in which the common IoT sensor data processing task is conversion to JSON may estimate that shifting execution of the JSON conversion task to the orchestrating IoT gateway device information handling system 200 may result in 50 tons of CO2 being emitted during transmission of unprocessed IoT sensor data from AP IoT server A 220, 13 tons of CO2 being emitted during transmission of unprocessed IoT sensor data from AP IoT server D 210, and 32.5 tons of CO2 being emitted during transmission of the JSON processed IoT sensor data from the orchestrating IoT gateway device information handling system 200 to the cloud computing platform 290, for a total of 95.5 tons of CO2.

As described above, the orchestrating IoT gateway device information handling system 200 may be capable of performing the common data processing task (e.g., encryption or conversion to JSON) on a larger pool of unprocessed IoT sensor data than any one of the AP IoT servers (e.g., 210 or 220), to maximize the volume of underlying unprocessed IoT sensor data upon which a single IoT sensor data processing task is performed. By maximizing the volume of the underlying unprocessed IoT sensor data upon which a single IoT sensor data processing task (e.g., encryption or conversion to JSON) is performed, the size of unprocessed IoT sensor data being transmitted between or among AP IoT servers and the orchestrating IoT gateway device information handling system 200 in the enterprise WAN may be decreased. So too does the overall size of processed IoT sensor data for transmission by the orchestrating IoT gateway device information handling system 200 to the cloud computing platform 290. For example, as described above, shifting the common encryption task from the AP IoT sensors 210 and 220 to the orchestrating IoT gateway device information handling system 200 in an embodiment may decrease the overall CO2 emissions from the initial CO2 emissions of 111.6 tons of CO2 to the adjusted CO2 emissions of 106 tons for transfer of IoT sensor data to the cloud computing platform 290. As another example, shifting the common JSON conversion task from the AP IoT sensors 210 and 220 to the orchestrating IoT gateway device information handling system 200 in an embodiment may decrease the CO2 emissions from the initial CO2 emissions of 109.5 tons of CO2 to the adjusted CO2 emissions of 95.5 tons for transfer of IoT sensor data to the cloud computing platform 290. The orchestrating IoT gateway device information handling system 200 in an embodiment may then transmit these initial and adjusted CO2 emissions to the manager for the enterprise WAN 260 to review or approve.

The manager of the enterprise WAN 260 may receive the initial CO2 emissions and adjusted CO2 emissions described directly above via any known means of communication including e-mail and text message. In other embodiments, the enterprise WAN 260 may include a graphical user interface 250 at which a user or manager of the enterprise WAN 260 may view the initial and adjusted CO2 emissions determined above. The manager of the enterprise WAN 260 may respond to the received communication or use the graphical user interface 250 to indicate acceptance of a recommendation to shift execution of the common IoT sensor data processing task to the orchestrating IoT gateway device information handling system 200 in order to decrease CO2 emissions from the initial CO2 emissions to the adjusted CO2 emissions.

Upon receipt of such a user-approval, or automatically with notification to the manager in some embodiments, the hardware processor of the orchestrating IoT gateway device information handling system 200 executing code instructions of the CO2 minimizing IoT edge gateway data processing orchestration system 280 in an embodiment may identify a load-balancing code instruction for cessation of the common IoT sensor data processing task at the relevant AP IoT servers operably connected in the enterprise WAN 260 that are associated with the preset task type identified as common by the orchestrating IoT gateway device information handling system 200. For example, in an embodiment, the CO2 minimizing IoT edge gateway data processing orchestration system 280 may have identified a plurality of JSON incidents received from both AP IoT server A 220 and AP IoT server D 210 having a classification "candidate_processing_task," and a value of "encryption." In such an embodiment, the hardware processor of the orchestrating IoT gateway device information handling system 200 executing code instructions of the CO2 minimizing IoT edge gateway data processing orchestration system 280 may identify a load-balancing code instruction for cessation of the common encryption task at AP IoT server A 220 and AP IoT server D 210 that is associated with the classification name "candidate_processing_task," having a value of "encryption." As another example, in an embodiment, the CO2 minimizing IoT edge gateway data processing orchestration system 280 may have identified a plurality of JSON incidents received from both AP IoT server A 220 and AP IoT server D 210 having a classification "candidate_processing_task," and a value of "JSON_conversion." In such an embodiment, the hardware processor of the orchestrating IoT gateway device information handling system 200 executing code instructions of the CO2 minimizing IoT edge gateway data processing orchestration system 280 may identify a load-balancing code instruction for cessation of the common JSON conversion task at AP IoT server A 220 and AP IoT server D 210 that is associated with the classification name "candidate_processing_task," having a value of "JSON conversion."

The hardware processor of the orchestrating IoT gateway device information handling system 200 executing code instructions of the CO2 minimizing IoT edge gateway data processing orchestration system 280 in an embodiment may transmit the load-balancing code instructions to the relevant AP IoT servers 220 and 210 operably connected within the enterprise WAN 260. For example, the hardware processor of the orchestrating IoT gateway device information handling system 200 executing code instructions of the CO2 minimizing IoT edge gateway data processing orchestration system 280 may transmit an instruction to AP IoT servers 210 and 220 to stop execution of the common encryption task, or the common JSON conversion task in various embodiments herein. The orchestrating IoT gateway device information handling system 200 may also receive instruction to execute the common IoT sensor data processing task locally on unprocessed IoT sensor data received from the relevant AP IoT servers 210 and 220.

Following receipt of these load-balancing instructions at the AP IoT servers 210 and 220 in an embodiment, each of the AP IoT servers 210 and 220 may transmit collect unprocessed IoT sensor data from a plurality of IoT sensors (e.g., 211a to 211n, or 221a to 221n, respectively). Instead of performing the common IoT sensor data processing task at the AP IoT servers 210 or 220, the AP IoT servers 210 and 220 in such an embodiment may follow the load-balancing instructions received from the orchestrating IoT gateway device information handling system 200 and transmit the unprocessed IoT sensor data directly to the orchestrating IoT gateway device information handling system 200 for processing there.

The hardware processor of the orchestrating IoT gateway device information handling system 200 executing code instructions of the CO2 minimizing IoT edge gateway data processing orchestration system 280 in an embodiment may gather such unprocessed IoT sensor data from each of the AP IoT servers (e.g., 210 and 220) that have received the load-balancing instruction prior to execution of the common IoT sensor data processing task at the orchestrating IoT gateway device information handling system 200. This may be necessary in order to take advantage of the fact that the orchestrating IoT gateway device information handling system 200 has access to a larger pool of IoT sensor data than either of the AP IoT servers (e.g., 220 and 210) individually. As described herein, maximizing the volume of underlying unprocessed IoT sensor data upon which a single IoT sensor data processing task is performed at the orchestrating IoT gateway device information handling system 200 in an embodiment may decrease the size of IoT sensor data being transmitted between AP IoT servers 210 and 220 and the orchestrating IoT gateway device information handling system 200 within an MNO or MVNO network of an enterprise WAN as well as the size of processed IoT sensor data transmitted to the cloud computing platform 290. This may, thus, reduce overall CO2 emitted as a consequence for some types of processing tasks. Upon receipt of the unprocessed IoT sensor data from each of the AP IoT servers (e.g., 210 and 220) that received the load-balancing instruction, the orchestrating IoT gateway device information handling system 200 may execute the common processing task on the unprocessed IoT sensor data received. For example, in an embodiment in which the common IoT sensor data processing task is encryption, the orchestrating IoT gateway device information handling system 200 may execute the encryption task (e.g., 256 bit SAE) on the larger, pooled unprocessed IoT sensor data received from IoT servers 220 and 210. The execution of the common IoT sensor data processing task of encryption on the pooled unprocessed IoT sensor via the hardware processor of the orchestrating IoT gateway device information handling system generates batch-processed IoT sensor data. As another example, in an embodiment in which the common IoT sensor data processing task is conversion to JSON, the orchestrating IoT gateway device information handling system 200 may convert the larger, pooled unprocessed IoT sensor data received from IoT servers 220 and 210 into a single JSON incident for the JSON processed IoT sensor data. This JSON processed IoT sensor data is batch-processed IoT sensor data. This batch-processed IoT sensor data is smaller in volume that plural processed IoT sensor data groups processed at and received from plural AP IoT servers and, thus, a smaller volume must be transmitted by the orchestrating IoT gateway device information handling system 200 to the cloud computing platform 290 over public network links on the gateway-cloud side.

The orchestrating IoT gateway device information handling system 200 in an embodiment may then transmit the processed IoT sensor data generated through execution of the common IoT sensor data processing task at the orchestrating IoT gateway device information handling system 200 to the cloud computing platform 290. For example, in an embodiment in which the common IoT sensor data processing task is encryption, the orchestrating IoT gateway device information handling system 200 may transmit the encrypted IoT sensor data to the cloud computing platform 290. As another example, in an embodiment in which the common IoT sensor data processing task is conversion to JSON, the orchestrating IoT gateway device information handling system 200 may transmit the JSON processed IoT sensor data to the cloud computing platform 290.

Figure 3:
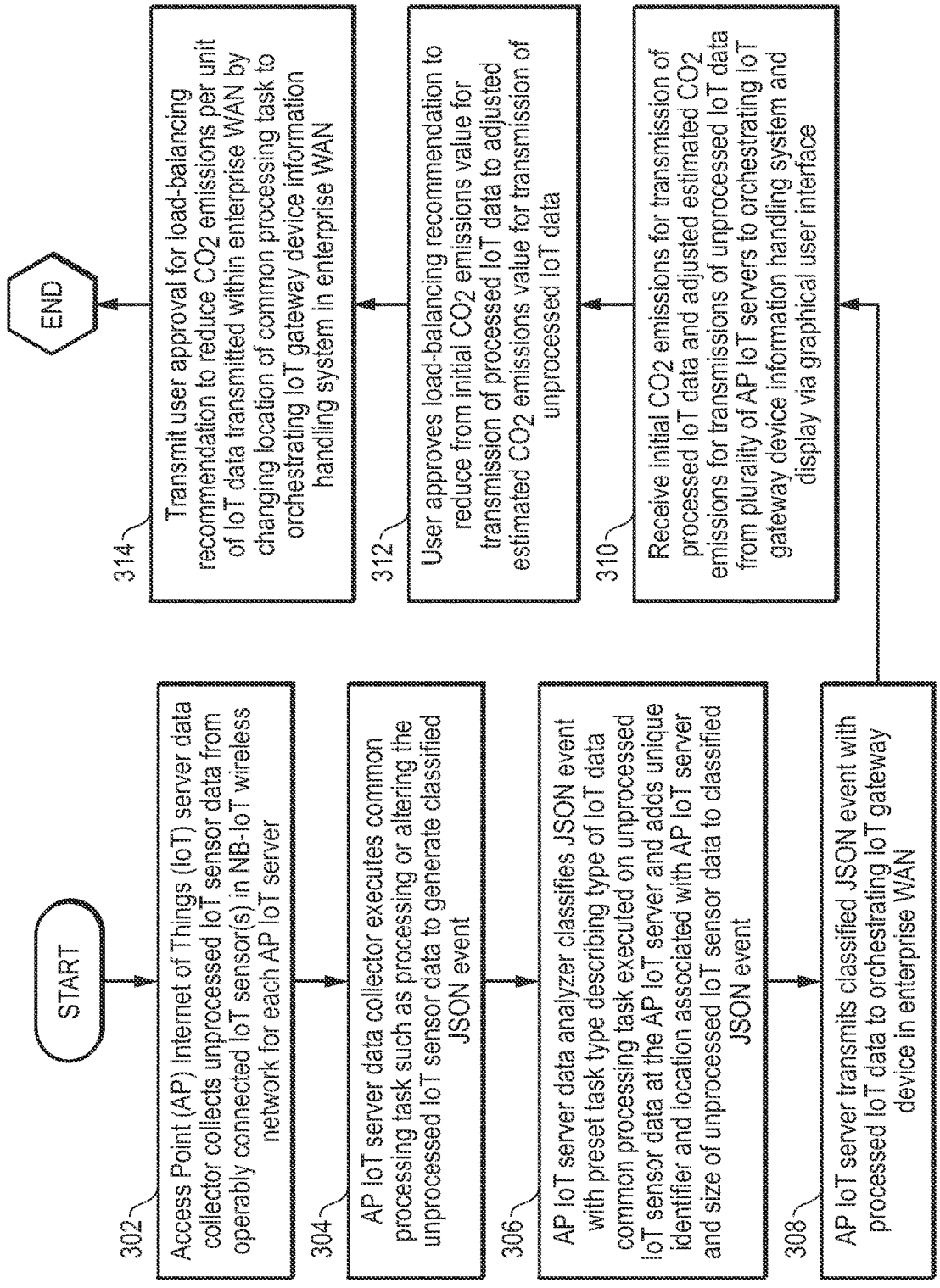
FIG. 3 is a flow diagram illustrating a method of generating data processing task-classified IoT sensor data from an AP IoT server processed with a common IoT data processing task and transmitting it to an orchestrating IoT gateway device information handling system according to an embodiment of the present disclosure.

FIG. 3 is a flow diagram illustrating a method of gathering IoT sensor data, determining data processing task-classification for the IoT sensor data, and transmitting the classified IoT sensor data an Access Point (AP) IoT server to an orchestrating IoT gateway device information handling system for further transmission to a cloud computing platform according to an embodiment of the present disclosure. As described herein, the orchestrating IoT gateway device information handling system in an embodiment may identify one or more AP IoT servers operatively coupled to it within its enterprise WAN at which an IoT sensor data processing tasks are being commonly executed, and shift execution of that task to the orchestrating IoT gateway device information handling system. This may reduce IoT data volume transmitted in the enterprise WAN to the orchestrating IoT gateway device information handling system for certain processing tasks and maximize the volume of data upon which a single IoT sensor data processing task is executed. This minimizes the size of transmitted data and CO2 emitted as a result of that transmission of IoT sensor data from the AP IoT servers to the cloud computing platform via the orchestrating IoT gateway device information handling system.

At block 302, a plurality of AP IoT servers may collect unprocessed IoT sensor data from operably connected IoT sensors within a LPWAN, such as in an NB-IoT wireless neighborhood that includes an AP IoT server and a plurality of IoT sensors. For example, in an embodiment described with reference to FIG. 2, each AP IoT server (e.g., 210, 220, 230, or 240) may collect unprocessed IoT sensor data from one or more IoT sensors (e.g., 211a-211n, 221a-221n, or 231) via NB-IoT links (e.g., 212a-212n, 222a-222n, or 232b and 232c), respectively. More specifically, a data collector 226 of the AP IoT server A 220 may collect unprocessed sensor data from IoT sensors 221a to 221n.

The AP IoT servers in an embodiment at block 304 may process or alter the unprocessed IoT sensor data. For example, each AP IoT server (e.g., 210, 220, 230, or 240) may perform at least one IoT sensor data processing task, such as encryption or conversion of the unprocessed IoT sensor data into a predetermined data interchange format (e.g., JavaScript Notation (JSON) or extensive markup language (XML)), to form processed IoT sensor data. More specifically, a data parser 223 of AP IoT server A 220 may convert unprocessed IoT sensor data received from IoT sensors 221a to 221n into a JSON format. A JSON incident may include an event ID for a given transmission of IoT sensor data (e.g., either processed or unprocessed) from the AP IoT server 220 to the orchestrating IoT gateway device information handling system 200 operably coupled within the enterprise WAN, a timestamp for that transmission, a volume of unprocessed IoT sensor data received at the AP IoT server 220 and transmitted during the identified transmission to the orchestrating IoT gateway device information handling system 200, the type of IoT sensor data processing task performed on the IoT sensor data at the AP IoT server 220 prior to transmission, and the volume of the processed IoT sensor data transmitted from the AP IoT server 220 to the orchestrating IoT gateway device information handling system 200. The information shown directly above may be appended to the unprocessed IoT sensor data received by the AP IoT server 220 as a header in some embodiments for identification of IoT sensor data and for classification of the IoT sensor data processing tasks associated with the IoT sensor data gathered.

At block 306, an AP IoT server data analyzer may classify the JSON event with a preset or otherwise defines IoT sensor data processing task type describing the type of IoT data processing task executed on the unprocessed IoT sensor data at the AP IoT server and add a unique identifier and location associated with the AP IoT server and size of unprocessed IoT sensor data to the classified JSON event. For example, upon reformatting of information in an embodiment, the data parser 223 may transmit the JSON incident to the data analyzer 224. In an embodiment, the data analyzer 224 may operate to analyze the contents of the JSON incident for processed IoT sensor data received, to classify the type of IoT sensor data processing tasks in the JSON events, and to edit the JSON incident to generate a second JSON incident that includes that IoT sensor data processing task classification type. IoT sensor data processing task classification types may be preset according to instructions received from the CO2 minimizing IoT edge gateway data processing orchestration system 280. Such classification types may assist the CO2 minimizing IoT edge gateway data processing orchestration system 280 in determining recommendations to shift execution of common IoT sensor data processing tasks currently executing at a plurality of AP IoT servers (e.g., 220 and 210) to execute at the orchestrating IoT gateway device information handling system 200 instead. This may be beneficial in the case where the IoT sensor data processing task listed within the JSON incident is known to increase the size of the processed IoT sensor data by the same amount or a consistent amount within an identifiable range, regardless of the size of the underlying unprocessed IoT sensor data (e.g., as described directly above with respect to encryption tasks). Thus, the CO2 minimizing IoT edge gateway data processing orchestration system 280 may have preset an IoT sensor data processing task classification type "candidate_processing_task" to identify specific processing tasks that increase the size of the processed IoT sensor data by the same amount, regardless of the size of the underlying unprocessed IoT sensor data as candidates for offloading from the plurality of AP IoT servers (e.g., 210 and 220) to the orchestrating IoT gateway device information handling system 200.

In an example embodiment, the data analyzer 224 in an embodiment may analyze the JSON incident to identify whether any of the JSON events and values associated with preset IoT sensor data processing task classification types appear within the JSON incident. For example, the data analyzer 242 in an embodiment may determine the JSON incident described above includes the JSON event named "encryption," having a value of "256_bit_SAE," and identify "encryption" as one of the preset IoT sensor data processing task classification types associated with IoT sensor data processing tasks known to increase the size of the processed IoT sensor data by the same amount, regardless of the size of the underlying unprocessed IoT sensor data. The data analyzer 224 in an embodiment may apply the "encryption" classification by editing the JSON incident received from the data parser 223 to generate a classified JSON incident.

The AP IoT server in an embodiment at block 308 may transmit the classified JSON event along with processed IoT sensor data to the orchestrating IoT gateway device information handling system in the enterprise WAN such as an MNO or MVNO network operated by an enterprise among plural enterprise facilities. For example, the full JSON incident, including the full header and all of the underlying IoT sensor data in an embodiment may be transmitted to the orchestrating IoT gateway device information handling system 200 from the AP IoT server A 220. This process of JSON incident creation and IoT sensor data processing task classification may be repeated at each of the AP IoT servers 210, 230, and 240 in an example embodiment.

The AP IoT servers or a user interface for the manager of the enterprise WAN, such as an MNO or MVNO network, may receive an initial and adjusted CO2 emissions value from the orchestrating IoT gateway device information handling system at block 310. For example, as described in greater detail below with respect to FIG. 4, and above with respect to FIG. 2, the orchestrating IoT gateway device information handling system 200 may be capable of performing common data processing tasks (e.g., encryption or conversion to JSON) on a larger pool of IoT sensor data than any one of the AP IoT servers (e.g., 210 or 220), to maximize the volume of underlying unprocessed IoT sensor data upon which a single IoT sensor data processing task is performed.

By maximizing the volume of the underlying unprocessed IoT sensor data upon which a single IoT sensor data processing task (e.g., encryption or conversion to JSON) is performed, the size of IoT sensor data being transmitted between AP-IoT servers and orchestrating IoT gateway device information handling systems within an enterprise WAN may be decreased. Further, processed IoT sensor data volume transmitted to a cloud computing platform 290 via public network links may also be reduced.

For example, shifting a common encryption task from the AP IoT sensors 210 and 220 to the orchestrating IoT gateway device information handling system 200 in an embodiment may decrease the overall CO2 emissions from the initial CO2 emissions of 111.6 tons of CO2 to the adjusted CO2 emissions of 106 tons for transfer of IoT sensor data to the cloud computing platform 290. As another example, shifting the common JSON conversion task from the AP IoT sensors 210 and 220 to the orchestrating IoT gateway device information handling system 200 in an embodiment may decrease the overall CO2 emissions from the initial CO2 emissions of 109.5 tons of CO2 to the adjusted CO2 emissions of 95.5 tons for transfer of IoT sensor data to the cloud computing platform 290. These initial and adjusted CO2 emissions values for one or both of the above described common IoT sensor data processing tasks may be received at either at orchestrating IoT gateway device information handling system 200 or at another user interface 250. By informing the manager of the network of these disparate CO2 emissions value via a user interface 250 in such a way, for example, the orchestrating IoT gateway device information handling system in an embodiment may highlight the impact of more efficient load-balancing techniques on CO2 emissions throughout the enterprise network for transfer of IoT sensor data to the cloud computing platform 290 to backend enterprise applications such as facility monitoring software.

At block 312, the user or manager of the enterprise WAN may approve of a recommendation to shift execution of a common IoT sensor data processing task from a plurality of AP IoT servers to an orchestrating IoT gateway device information handling system to decrease the CO2 emissions for the transmission of IoT sensor data in the enterprise WAN from the initial CO2 emissions value to the adjusted CO2 emissions value. For example, the manager of the enterprise WAN 260 in an embodiment may provide such approval via the user interface 250. In other embodiments, a notification may be provided to the orchestrating IoT gateway device information handling system 200 or other user interface 250 indicating to the manager of the enterprise WAN that execution of common processing tasks have been shifted to the orchestrating IoT gateway device information handling system 200 rather than require approval from the manager.

In the embodiment where approval is necessary, such an approval may then be transmitted from the user interface 250 to the hardware processor of the orchestrating IoT gateway device information handling system 200 or received at the same at block 314. With this approval, or automatically in some embodiments, the CO2 minimizing IoT edge gateway data processing orchestration system may generate a load-balancing instruction and instruction for execution to shift execution of identified common IoT sensor data processing tasks from one or more relevant AP IoT servers to the orchestrating IoT gateway device information handling system. This is described further in embodiments herein. At this point the method of FIG. 3 may end.

Figure 4:
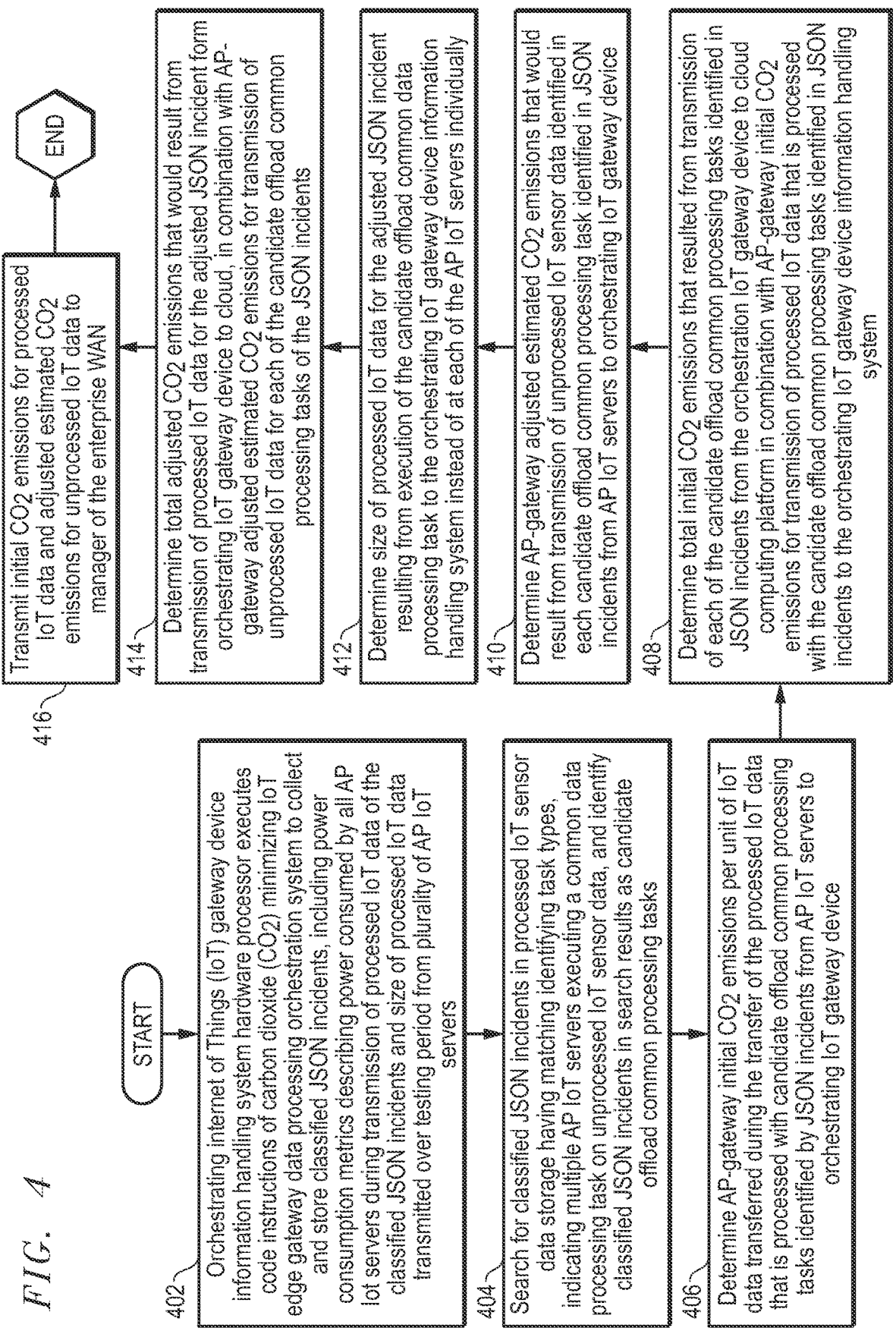
FIG. 4 is a flow diagram illustrating a method of determining an adjusted amount of estimated $CO_2$ that would be emitted upon shifting of a common IoT sensor data processing task to the orchestrating IoT gateway device information handling system from the plurality of operably connected AP IoT servers according to an embodiment of the present disclosure.

FIG. 4 is a flow diagram illustrating a method of determining an adjusted amount of carbon dioxide (CO2) that would be emitted upon shifting execution of an IoT sensor data processing task from a plurality of Access Point (AP) IoT servers to the orchestrating IoT gateway device information handling system according to an embodiment of the present disclosure. As described herein, a hardware processor of an orchestrating IoT gateway device information handling system executing code instructions of the CO2 minimizing IoT edge gateway data processing orchestration system in an embodiment may minimize the total CO2 emitted during the transfer of IoT sensor data between a plurality of AP IoT servers to an orchestrating IoT gateway device information handling system operably coupled within an enterprise WAN (e.g., a mobile network operator (MNO) or mobile virtual network operator (MVNO) network operative by an enterprise) and to a cloud computing platform by shifting common data processing tasks executing at a plurality of AP IoT servers to execute at the orchestrating IoT gateway device information handling system instead. This may be appropriate where it is determined that such a shift may conserve CO2 emissions across the enterprise WAN and any network linking to the cloud computing platform as a whole.

At block 402, the hardware processor for the orchestrating IoT gateway information handling system executing code instructions of the CO2 minimizing IoT edge gateway data processing orchestration system may collect and store classified JSON incidents, including power consumption metrics describing power consumed by the AP IoT servers during transmission of processed IoT sensor data of the classified JSON incidents and the size of IoT data transmitted over a testing period from a plurality of AP IoT servers that are stored in processed IoT sensor data storage. For example, in an embodiment described with reference to FIG. 2, the hardware processor of an orchestrating IoT gateway device information handling system 200 executing code instructions of the CO2 minimizing IoT edge gateway data processing orchestration system 280 in an embodiment may receive the processed IoT sensor data of classified JSON incidents (or classified and converted IoT sensor data in another format such as XML) from a plurality of AP IoT servers (e.g., 210, 220, 230, and 240). The hardware processor executing code instructions of the CO2 minimizing IoT edge gateway data processing orchestration system 280 may store such received processed IoT sensor data within a processed IoT sensor data pool 285 with the identifying JSON incidents.

The hardware processor for the orchestrating IoT gateway information handling system executing code instructions of the CO2 minimizing IoT edge gateway data processing orchestration system in an embodiment at block 404 may search the classified JSON incidents in the processed IoT sensor data storage having matching identifying IoT sensor data processing task types from non-matching AP IoT identifiers. This may indicate that a plurality of AP IoT servers are executing a common data processing task on incoming unprocessed IoT sensor data. The hardware processor for the orchestrating IoT gateway information handling system executing code instructions of the CO2 minimizing IoT edge gateway data processing orchestration system may then identify the classified JSON incidents in these search results as candidate offload common IoT sensor data processing tasks identified with JSON incidents.

For example, the hardware processor of the orchestrating IoT gateway device information handling system 200 executing code instructions of the CO2 minimizing IoT edge gateway data processing orchestration system 280 in an embodiment may search the processed IoT sensor data pool 285 to identify a plurality of JSON incidents having the classification "candidate_processing_task." and a value of "encryption." In another example, the hardware processor of the orchestrating IoT gateway device information handling system 200 executing code instructions of the CO2 minimizing IoT edge gateway data processing orchestration system 280 may search the processed IoT sensor data 285 to identify a plurality of JSON incidents having the classification "candidate_processing_task." and a value of "JSON_conversion." In either of these example embodiments, the hardware processor of the orchestrating IoT gateway device information handling system 200 executing code instructions of the CO2 minimizing IoT edge gateway data processing orchestration system 280 may identify each of these JSON incidents as sharing a candidate common IoT sensor data processing task (e.g., encryption or JSON conversion).

Upon identifying a plurality of JSON incidents having the same IoT sensor data processing task classification type, the hardware processor of the orchestrating IoT gateway device information handling system 200 executing code instructions of the CO2 minimizing IoT edge gateway data processing orchestration system 280 may determine that the plurality of JSON incidents were received from different AP IoT servers (e.g., 210 and 220). For example, the hardware processor of the orchestrating IoT gateway device information handling system 200 executing code instructions of the CO2 minimizing IoT edge gateway data processing orchestration system 280 in an embodiment may determine that a portion of the plurality of JSON incidents that include the classification "candidate_processing_task," having a value of "JSON_conversion" were generated at AP IoT server A 220 and a portion were generated at AP IoT server D 210. In another example, the CO2 minimizing IoT edge gateway data processing orchestration system 280 in an embodiment may determine that a portion of the plurality of JSON incidents that include the classification "candidate_processing_task," having a value of "encryption" were generated at AP IoT server A 220 and a portion were generated at AP IoT server D 210. Each of these JSON incidents in an embodiment may be identified by the CO2 minimizing IoT edge gateway data processing orchestration system 280 in an embodiment as candidate offload common IoT sensor data processing tasks identified with JSON incidents.

At block 406, the hardware processor for the orchestrating IoT gateway executing code instructions of the CO2 minimizing IoT edge gateway data processing orchestration system in an embodiment may determine an AP-gateway side initial CO2 emissions value per unit of IoT data transferred due to the transfer of each of the candidate offload common IoT sensor data processing tasks identified with JSON incidents from the AP IoT servers to the orchestrating IoT gateway device information handling system. For example, the hardware processor of the orchestrating IoT gateway device information handling system executing code instructions of the CO2 minimizing IoT edge gateway data processing orchestration system 280 in an embodiment may determine the amount of CO2 emitted due to power consumed during transmission of the processed IoT sensor data from the AP IoT servers (e.g., 210 and 220) identified in the JSON incidents for candidate offload common IoT sensor data processing tasks identified to shift performing a common IoT sensor data processing task (e.g., encryption, JSON conversion) to the orchestrating IoT gateway device information handling system 200. More specifically, the CO2 minimizing IoT edge gateway data processing orchestration system 280 in an embodiment may refer to the CO2 emissions database 291 to determine an amount of CO2 emitted per kWh of power consumed at the geographic location of each of the AP IoT servers (e.g., 210 and 220), as shown within the candidate offload common IoT sensor data processing tasks identified with the JSON incidents. The CO2 minimizing IoT edge gateway data processing orchestration system 280 in an embodiment may then multiply this value of CO2 weight (e.g., in lbs, tons, kgs) per kWh by the power consumed during transmission of the processed IoT sensor data (e.g., in kWh) by each candidate AP IoT server (e.g., 210 and 220).

For example, the hardware processor of the orchestrating IoT gateway device information handling system 200 executing code instructions of the CO2 minimizing IoT edge gateway data processing orchestration system 280 may determine the AP IoT server A 220 caused 24,000 pounds or 12 tons of CO2 to be emitted during the transmission of 120 GB of processed IoT sensor data to the orchestrating IoT gateway device information handling system 200, due to the consumption of 48,000 kWh of power in Austin, TX, where the power supplier generates 0.5 pounds of CO2 per kWh generated as hypothetically reported from the CO2 emissions database 291. As another example, the CO2 minimizing IoT edge gateway data processing orchestration system 280 may determine the AP IoT server A 220 caused roughly 110,000 pounds or 55 tons of CO2 to be emitted during the transmission of 550 GB of processed IoT sensor data to the orchestrating IoT gateway device information handling system 200, due to the consumption of 220,000 kWh of power in Austin, TX, where the power supplier generates 0.5 pounds of CO2 per kWh generated.

In yet another example, the hardware processor of the orchestrating IoT gateway device information handling system 200 executing code instructions of the CO2 minimizing IoT edge gateway data processing orchestration system 280 may determine the AP IoT server D 210 caused 135,000 pounds or 67.6 tons of CO2 to be emitted during the transmission of 520 GB of processed IoT sensor data to the orchestrating IoT gateway device information handling system 200, due to the consumption of 225.333 kWh of power in Denver, CO, where the power supplier generates 0.6 pounds of CO2 per kWh generated as hypothetically reported from the CO2 emissions database 291. As another example, the CO2 minimizing IoT edge gateway data processing orchestration system 280 may determine the AP IoT server D 210 caused 39,000 pounds or 19.5 tons of CO2 to be emitted during the transmission of 150 GB of processed IoT sensor data to the orchestrating IoT gateway device information handling system 200, due to the consumption of 65,000 kWh of power in Denver, CO, where the power supplier generates 0.6 pounds of CO2 per kWh generated.

The hardware processor for the orchestrating IoT gateway information handling system executing code instructions of the CO2 minimizing IoT edge gateway data processing orchestration system in an embodiment at block 408 may determine a total initial CO2 emissions that resulted from transmission of processed IoT sensor data for each of the candidate offload common IoT sensor data processing tasks identified with JSON incidents from the AP IoT servers to the orchestration IoT gateway device and then to the cloud. This may comprise combining the AP-gateway side initial CO2 emissions for transmission of processed IoT sensor data processed with the candidate offload common IoT sensor data processing tasks identified with JSON incidents to the orchestrating IoT gateway device, as determined at block 406, with a similarly determined amount of gateway-cloud side CO2 initially emitted during transmission of processed IoT sensor data from the orchestrating IoT gateway device information handling system to the cloud computing platform. Similar to the determination made at block 406, such a determination may also be made for the amount of CO2 emitted due to power consumed at the orchestrating IoT gateway device information handling system during transmission of the processed IoT sensor data received from each of these AP IoT servers for transmission to the cloud computing platform.

For example, the hardware processor of the orchestrating IoT gateway device information handling system 200 executing code instructions of the CO2 minimizing IoT edge gateway data processing orchestration system 280 may determine that transmission of the 120 GB of processed IoT sensor data, received from AP IoT server A 220, for transmission by the orchestrating IoT gateway device information handling system 200 to the cloud computing platform 290 consumed 17,143 kWh of power at the location of the CO2 minimizing IoT edge gateway data processing orchestration system 280 in Dallas, TX. In Dallas, where power stations cause an average of 0.7 pounds of CO2 per kWh as hypothetically reported in a CO2 emissions database will thus cause CO2 emissions of 12,000 pounds or 6 tons. As another example, the CO2 minimizing IoT edge gateway data processing orchestration system 280 may determine that transmission of the 550 GB of processed IoT sensor data, received from AP IoT server A 220, for transmission by the orchestrating IoT gateway device information handling system 200 to the cloud computing platform 290 consumed 78,571 kWh of power at the location of the CO2 minimizing IoT edge gateway data processing orchestration system 280 in Dallas, TX. The Dallas power stations cause an average of 0.7 pounds of CO2 per kWh which causes CO2 emissions of 55,000 pounds or 27.5 tons. As yet another example, the CO2 minimizing IoT edge gateway data processing orchestration system 280 may determine that transmission of the 520 GB of processed IoT sensor data, received from AP IoT server D 210, for transmission by the orchestrating IoT gateway device information handling system 200 to the cloud computing platform 290 consumed 74,286 kWh of power at the location of the CO2 minimizing IoT edge gateway data processing orchestration system 280 in Dallas, TX. Since the power stations there utilize an average of 0.7 pounds of CO2 per kWh this causes CO2 emissions of 52,000 pounds or 26 tons. In still another example, the CO2 minimizing IoT edge gateway data processing orchestration system 280 may determine that transmission of the 150 GB of processed IoT sensor data, received from AP IoT server D 210, for transmission by the orchestrating IoT gateway device information handling system 200 to the cloud computing platform 290 consumed 21,429 kWh of power at the location of the CO2 minimizing IoT edge gateway data processing orchestration system 280 in Dallas, TX. Again, those power stations cause an average of 0.7 pounds of CO2 per kWh which causes CO2 emissions of 15,000 pounds or 7.5 tons.

In an embodiment, the hardware processor of the orchestrating IoT gateway device information handling system 200 executing code instructions of the CO2 minimizing IoT edge gateway data processing orchestration system 280 may determine a total initial CO2 emissions that resulted from transmission of processed IoT server data processed by each of the candidate offload common IoT sensor data processing tasks identified with JSON incidents from the AP IoT servers (e.g., 210 and 220) to the orchestrating IoT gateway device information handling system 200 and then to the cloud computing platform 290. For example, in an embodiment in which the common IoT sensor data processing task is encryption, the hardware processor of the orchestrating IoT gateway device information handling system 200 executing code instructions of the CO2 minimizing IoT edge gateway data processing orchestration system 280 may determine that transmission of the encrypted IoT sensor data caused CO2 emissions of 12 tons at AP IoT A server 220, 67.6 tons at AP IoT server D 210, and a total of 32 tons from the orchestrating IoT gateway device information handling system 200 to the cloud computing platform 290, for a total initial CO2 emissions value of 111.6 tons. As another example, in an embodiment in which the common IoT sensor data processing task is conversion to JSON, the hardware processor of the orchestrating IoT gateway device information handling system 200 executing code instructions of the CO2 minimizing IoT edge gateway data processing orchestration system 280 may determine that transmission of the JSON converted IoT sensor data caused CO2 emissions of 55 tons at AP IoT A server 220, 19.5 tons at AP IoT server D 210, and a total of 35 tons from the orchestrating IoT gateway device information handling system 200 to the cloud computing platform 290, for a total initial CO2 emissions value of 109.5 tons.

At block 410, the hardware processor for the orchestrating IoT gateway executing code instructions of the CO2 minimizing IoT edge gateway data processing orchestration system may determine an AP-gateway side adjusted CO2 emissions value that would result from transmission of unprocessed IoT sensor data identified in each of the candidate offload common IoT sensor data processing tasks identified with JSON incidents from the AP IoT servers to the orchestrating IoT gateway device information handling system. For example, the hardware processor of the orchestrating IoT gateway device information handling system 200 executing code instructions of the CO2 minimizing IoT edge gateway data processing orchestration system 280 may first determine processed IoT data transmission levels for IoT sensor data processed at the AP IoT servers. For each of the AP IoT servers (e.g., 210 and 220) associated with candidate offload common IoT sensor data processing tasks identified with JSON incidents, an amount of CO2 emitted per unit of processed IoT sensor data transmitted is determined. More specifically, the hardware processor of the orchestrating IoT gateway device information handling system 200 executing code instructions of the CO2 minimizing IoT edge gateway data processing orchestration system 280 in an embodiment in which the candidate offload common IoT sensor data processing tasks identified with JSON incident identifies the common IoT sensor data processing task of encryption may determine that transmission of 120 GB of encrypted IoT sensor data from AP IoT server A 220 to the orchestrating IoT gateway device information handling system 200 caused 12 tons of CO2 emissions, at a rate of 0.1 tons of CO2 per GB transmitted. In another example embodiment, the hardware processor of the orchestrating IoT gateway device information handling system 200 executing code instructions of the CO2 minimizing IoT edge gateway data processing orchestration system 280 in an embodiment in which the candidate offload common IoT sensor data processing tasks identified with JSON incident identifies the common IoT sensor data processing task of conversion to JSON may determine that transmission of 150 GB of IoT sensor data in the form of JSON processed IoT sensor data from AP IoT server D 210 to the orchestrating IoT gateway device information handling system 200 caused 19.5 tons of CO2 emissions, at a rate of 0.13 tons of CO2 per GB transmitted.

In yet another example embodiment, the hardware processor of the orchestrating IoT gateway device information handling system 200 executing code instructions of the CO2 minimizing IoT edge gateway data processing orchestration system 280 in an embodiment in which the candidate offload common IoT sensor data processing tasks identified with JSON incident identifies the common IoT sensor data processing task of encryption may determine that transmission of 120 GB of encrypted IoT sensor data from the orchestrating IoT gateway device information handling system 200 to the cloud computing platform 290 caused 6 tons of CO2 emissions, at a rate of 0.05 tons of CO2 per GB transmitted.

The hardware processor of the orchestrating IoT gateway device information handling system 200 executing code instructions of the CO2 minimizing IoT edge gateway data processing orchestration system 280 in an embodiment may then multiply this CO2 per GB rate by the volume of unprocessed IoT sensor data received at the respective AP IoT servers (e.g., 210 and 220), prior to execution at those AP IoT servers (e.g., 210 and 220) of the common IoT sensor data processing task (e.g., encryption or conversion to JSON). For example, the hardware processor of the orchestrating IoT gateway device information handling system 200 executing code instructions of the CO2 minimizing IoT edge gateway data processing orchestration system 280 may multiply the 0.1 tons of CO2 per GB rate determined for AP IoT server A 220 by the 100 GB volume of unprocessed IoT sensor data upon which the AP IoT server A 220 previously performed the common encryption task. In such a way, the hardware processor of the orchestrating IoT gateway device information handling system 200 executing code instructions of the CO2 minimizing IoT edge gateway data processing orchestration system 280 may estimate that the AP IoT server A 220 would have caused the emission of 10 tons of CO2 by transmitting the unprocessed IoT sensor data prior to execution of the common encryption task. As another example, the hardware processor of the orchestrating IoT gateway device information handling system 200 executing code instructions of the CO2 minimizing IoT edge gateway data processing orchestration system 280 may multiply the 0.1 tons of CO2 per GB rate determined for AP IoT server A 220 by the 500 GB volume of unprocessed IoT sensor data upon which the AP IoT server A previously performed the common JSON conversion task. In such a way, the hardware processor of the orchestrating IoT gateway device information handling system 200 executing code instructions of the CO2 minimizing IoT edge gateway data processing orchestration system 280 may estimate that the AP IoT server A 220 would have caused the emission of 50 tons of CO2 by transmitting the unprocessed IoT sensor data prior to execution of the common JSON conversion task.

In yet another example, the hardware processor of the orchestrating IoT gateway device information handling system 200 executing code instructions of the CO2 minimizing IoT edge gateway data processing orchestration system 280 may multiply the 0.13 tons of CO2 per GB rate determined for AP IoT server D 210 by the 500 GB volume of unprocessed IoT sensor data upon which the AP IoT server D 210 previously performed the common encryption task. In such a way, the hardware processor of the orchestrating IoT gateway device information handling system 200 executing code instructions of the CO2 minimizing IoT edge gateway data processing orchestration system 280 may estimate that the AP IoT server D 210 would have caused the emission of 65 tons of CO2 by transmitting the unprocessed IoT sensor data prior to execution of the common encryption task. In still another example, the hardware processor of the orchestrating IoT gateway device information handling system 200 executing code instructions of the CO2 minimizing IoT edge gateway data processing orchestration system 280 may multiply the 0.13 tons of CO2 per GB rate determined for AP IoT server D 210 by the 100 GB volume of unprocessed IoT sensor data upon which the AP IoT server D 210 previously performed the common JSON conversion task. In such a way, the hardware processor of the orchestrating IoT gateway device information handling system 200 executing code instructions of the CO2 minimizing IoT edge gateway data processing orchestration system 280 may estimate that the AP IoT server D 210 would have caused the emission of 13 tons of CO2 by transmitting the unprocessed IoT sensor data prior to execution of the common JSON conversion task.

The hardware processor for the orchestrating IoT gateway executing code instructions of the CO2 minimizing IoT edge gateway data processing orchestration system in an embodiment at block 412 may determine the size of the adjusted JSON incident for unprocessed IoT sensor data that likely would have resulted from execution of the common IoT sensor data processing task at the orchestrating IoT gateway device information handling system instead of at each of the AP IoT servers individually. For example, the hardware processor of the orchestrating IoT gateway device information handling system 200 executing code instructions of the CO2 minimizing IoT edge gateway data processing orchestration system 280 in an embodiment may estimate CO2 that would be emitted during transfer of processed IoT sensor data from the AP IoT server to the orchestrating IoT gateway device information handling system 200 in the case where the orchestrating IoT gateway device information handling system 200 performs the common data processing task.

In such a scenario, the orchestrating IoT gateway device information handling system 200 may perform such a common data processing task (e.g., encryption or conversion to JSON) on a larger volume of data than either of the AP IoT servers (e.g., 210 and 220) can access. As described above, in the case where each AP IoT server (e.g., 210 and 220) individually executes the common data processing task (e.g., encryption or conversion to JSON), a separate processed IoT sensor data file for each AP IoT servers (e.g., 210 or 220) from which such processed IoT sensor data has been received at the orchestrating IoT gateway device information handling system 200 may be transmitted separately to the cloud computing platform 290 also increasing the amount of processed IoT sensor data to be transmitted. In the case where the orchestrating IoT gateway device information handling system 200 performs such a common data processing task instead, the orchestrating IoT gateway device information handling system 200 may pool all of the unprocessed IoT sensor data received from each of these AP IoT servers (e.g., 210 or 220) and perform the common data processing method on this large pool of IoT sensor data at one time for a reduced amount of processed IoT sensor data to be transmitted to the cloud computing platform 290. The size of the processed IoT sensor data resulting from processing pooled unprocessed IoT sensor data at the orchestrating IoT gateway device information handling system 200 may be estimated for batch-processed IoT sensor data from common IoT sensor data processing tasks executed at the orchestrating IoT gateway device information handling system 200. Further, the CO2 level may be estimated based on power per distance estimation for data volumes of this batch-processed IoT sensor data.

For example, in an embodiment in which the common IoT sensor data processing task is encryption, the hardware processor of the orchestrating IoT gateway device information handling system 200 executing code instructions of the CO2 minimizing IoT edge gateway data processing orchestration system 280 may estimate the size of the encrypted IoT sensor data that may be generated if the encryption task were performed at the orchestrating IoT gateway device information handling system 200 on the 100 GB of unprocessed IoT sensor data collected at the AP IoT server A 220 and the 500 GB of unprocessed IoT sensor data collected at the AP IoT server D 210. The hardware processor of the orchestrating IoT gateway device information handling system 200 executing code instructions of the CO2 minimizing IoT edge gateway data processing orchestration system 280 may first determine a margin by which the encryption task increased the underlying unprocessed IoT sensor data volume at either of the AP IoT servers (e.g., 210 or 220) that previously executed this task. For example, the hardware processor of the orchestrating IoT gateway device information handling system 200 executing code instructions of the CO2 minimizing IoT edge gateway data processing orchestration system 280 may determine that encryption at the IoT server A 220 increased the volume of the unprocessed IoT sensor data from 100 GB to 120 GB, or by a margin of 20 GB. As another example, the hardware processor of the orchestrating IoT gateway device information handling system 200 executing code instructions of the CO2 minimizing IoT edge gateway data processing orchestration system 280 may determine that encryption at the IoT server D 210 increased the volume of the unprocessed IoT sensor data from 500 GB to 520 GB, or by a margin of 20 GB. In some cases, the margin determined for one of the AP IoT servers may not match the margin of the other AP IoT server(s). In such an example case, the hardware processor of the orchestrating IoT gateway device information handling system 200 executing code instructions of the CO2 minimizing IoT edge gateway data processing orchestration system 280 may assume a global margin equivalent to the highest margin determined across all AP IoT servers.

The hardware processor of the orchestrating IoT gateway device information handling system 200 executing code instructions of the CO2 minimizing IoT edge gateway data processing orchestration system 280 may then estimate the size of the encrypted IoT sensor data that will be generated if the encryption task were executed at the orchestrating IoT gateway device information handling system 200 by adding this same margin to the sum of the unprocessed IoT sensor data received from all AP IoT servers (e.g., 210 and 220) identified as previously executing the common encryption task. For example, the hardware processor of the orchestrating IoT gateway device information handling system 200 executing code instructions of the CO2 minimizing IoT edge gateway data processing orchestration system 280 may estimate that the orchestrating IoT gateway device information handling system 200 executing the common encryption task on the 100 GB of unprocessed IoT sensor data received from AP IoT server A 220 and the 500 GB of unprocessed IoT sensor data received from AP IoT server D 210, simultaneously, would generate a volume of 620 GB.

As another example, in an embodiment in which the common IoT sensor data processing task is conversion to JSON, the hardware processor of the orchestrating IoT gateway device information handling system 200 executing code instructions of the CO2 minimizing IoT edge gateway data processing orchestration system 280 may estimate the size of the JSON processed IoT sensor data that may be generated if the JSON conversion task were performed at the orchestrating IoT gateway device information handling system 200 on the 500 GB of unprocessed IoT sensor data collected at the AP IoT server A 220 and the 100 GB of unprocessed IoT sensor data collected at the AP IoT server D 210. The hardware processor of the orchestrating IoT gateway device information handling system 200 executing code instructions of the CO2 minimizing IoT edge gateway data processing orchestration system 280 may first determine a margin by which the JSON conversion task increased the underlying unprocessed IoT sensor data volume at either of the AP IoT servers (e.g., 210 or 220) that previously executed this task. For example, the hardware processor of the orchestrating IoT gateway device information handling system 200 executing code instructions of the CO2 minimizing IoT edge gateway data processing orchestration system 280 may determine that conversion to JSON at the IoT server A 220 increased the volume of the unprocessed IoT sensor data from 500 GB to 550 GB, or by a margin of 50 GB. As another example, the hardware processor of the orchestrating IoT gateway device information handling system 200 executing code instructions of the CO2 minimizing IoT edge gateway data processing orchestration system 280 may determine that conversion to JSON at the IoT server D 210 increased the volume of the unprocessed IoT sensor data from 100 GB to 150 GB, or by a margin of 50 GB.

The hardware processor of the orchestrating IoT gateway device information handling system 200 executing code instructions of the CO2 minimizing IoT edge gateway data processing orchestration system 280 may then estimate the size of the encrypted IoT sensor data that would be generated if the encryption task were executed at the orchestrating IoT gateway device information handling system 200 by adding this same margin to the sum of the unprocessed IoT sensor data received from all AP IoT servers (e.g., 210 and 220) identified as previously executing the common JSON conversion task. For example, the hardware processor of the orchestrating IoT gateway device information handling system 200 executing code instructions of the CO2 minimizing IoT edge gateway data processing orchestration system 280 may estimate that the orchestrating IoT gateway device information handling system 200 executing the common JSON conversion task on the 500 GB of unprocessed IoT sensor data received from AP IoT server A 220 and the 100 GB of unprocessed IoT sensor data received from AP IoT server D 210, simultaneously, would generate a volume of 650 GB.

At block 414, the hardware processor for the orchestrating IoT gateway executing code instructions of the CO2 minimizing IoT edge gateway data processing orchestration system in an embodiment may determine a total adjusted CO2 emissions that would result from transmission of the unprocessed IoT sensor data from the AP IoT servers to the orchestrating IoT gateway device information handling system 200, and processing and transmission of the processed IoT sensor data for the adjusted JSON incident from the orchestrating IoT gateway device information handling system to the cloud computing device. In an embodiment, the hardware processor of the orchestrating IoT gateway device information handling system 200 executing code instructions of the CO2 minimizing IoT edge gateway data processing orchestration system 280 may estimate an amount of CO2 that would be emitted during transmission to the cloud computing platform 290 from the estimated volume of data generated during execution of the common IoT sensor data processing task at the orchestrating IoT gateway device information handling system 200. For example, the hardware processor of the orchestrating IoT gateway device information handling system 200 executing code instructions of the CO2 minimizing IoT edge gateway data processing orchestration system 280 may estimate that transmission of 620 GB of encrypted IoT sensor data from the orchestrating IoT gateway device information handling system 200 to the cloud computing platform 290 at a rate (e.g., as determined above) of 0.05 tons of CO2 per GB transmitted may result in the emission of 31 tons of CO2. As another example, the hardware processor of the orchestrating IoT gateway device information handling system 200 executing code instructions of the CO2 minimizing IoT edge gateway data processing orchestration system 280 may estimate that transmission of a 650 GB JSON processed IoT sensor data from the orchestrating IoT gateway device information handling system 200 to the cloud computing platform 290 at a rate (e.g., as determined above) of 0.05 tons of CO2 per GB transmitted may result in the emission of 32.5 tons of CO2.

The hardware processor of the orchestrating IoT gateway device information handling system 200 executing code instructions of the CO2 minimizing IoT edge gateway data processing orchestration system 280 may estimate a total amount of CO2 that would be emitted if the common IoT sensor data processing task were shifted to the orchestrating IoT gateway device information handling system 200. For example, the hardware processor of the orchestrating IoT gateway device information handling system 200 executing code instructions of the CO2 minimizing IoT edge gateway data processing orchestration system 280 in an embodiment in which the common IoT sensor data processing task is encryption may estimate that shifting execution of the encryption task to the orchestrating IoT gateway device information handling system 200 may result in 10 tons of CO2 being emitted during transmission of unprocessed IoT sensor data from AP IoT server A 220, 65 tons of CO2 being emitted during transmission of unprocessed IoT sensor data from AP IoT server D 210 orchestrating IoT gateway device information handling system 200, and 31 tons of CO2 being emitted during transmission of the encrypted IoT sensor data from the orchestrating IoT gateway device information handling system 200 to the cloud computing platform 290, for a total of 106 tons of CO2. As another example, the hardware processor of the orchestrating IoT gateway device information handling system 200 executing code instructions of the CO2 minimizing IoT edge gateway data processing orchestration system 280 in an embodiment in which the common IoT sensor data processing task is conversion to JSON may estimate that shifting execution of the JSON conversion task to the orchestrating IoT gateway device information handling system 200 may result in 50 tons of CO2 being emitted during transmission of unprocessed IoT sensor data from AP IoT server A 220, 13 tons of CO2 being emitted during transmission of unprocessed IoT sensor data from AP IoT server D 210 to the orchestrating IoT gateway device information handling system 200, and 32.5 tons of CO2 being emitted during transmission of the JSON processed IoT sensor data from the orchestrating IoT gateway device information handling system 200 to the cloud computing platform 290, for a total of 95.5 tons of CO2.

At block 416, the initial CO2 levels for execution at AP IoT servers and the adjusted CO2 emissions levels for execution at the orchestrating IoT gateway device information handling system 200 may then be transmitted to a user or manager for enterprise WAN to determine whether to generate and perform a load-balancing instruction at one or more AP IoT servers in order to achieve the adjusted CO2 emissions value. For example, the orchestrating IoT gateway device information handling system 200 in an embodiment may transmit these initial and adjusted CO2 emissions to the manager for the enterprise WAN 260, for viewing via the user interface 250. As described herein, the orchestrating IoT gateway device information handling system 200 may be capable of performing the common data processing task (e.g., encryption or conversion to JSON) on a larger pool of IoT sensor data than any one of the AP IoT servers (e.g., 210 or 220), to maximize the volume of underlying unprocessed IoT sensor data upon which a single IoT sensor data processing task is performed. As described, this may reduce IoT sensor data volume of the unprocessed IoT sensor data transmitted within the enterprise WAN on the AP-gateway side. By maximizing the volume of the underlying unprocessed IoT sensor data upon which a single IoT sensor data processing task (e.g., encryption or conversion to JSON) is performed, the size of unprocessed IoT sensor data being transmitted between AP IoT servers and orchestrating IoT gateway device information handling systems within an enterprise WAN may be decreased. Further, the volume of processed IoT sensor data processed at the orchestrating IoT gateway device information handling system 200 for transmission to the cloud computing platform 290 is also reduced by the single execution of common IoT sensor data processing tasks on the larger pool of unprocessed IoT sensor data.

For example, as described above, shifting the common encryption task from the AP IoT sensors 210 and 220 to the orchestrating IoT gateway device information handling system 200 in an embodiment may decrease the CO2 emissions from the initial CO2 emissions of 111.6 tons of CO2 to the adjusted CO2 emissions of 106 tons. As another example, shifting the common JSON conversion task from the AP IoT sensors 210 and 220 to the orchestrating IoT gateway device information handling system 200 in an embodiment may decrease the CO2 emissions from the initial CO2 emissions of 109.5 tons of CO2 to the adjusted CO2 emissions of 95.5 tons. By informing the manager of the network of these disparate CO2 emissions value in such a way, the orchestrating IoT gateway device information handling system in an embodiment may highlight the impact of more efficient load-balancing techniques on CO2 emissions throughout the network. In other embodiments, an automatic load balancing instruction and instruction to shift execution of common IoT sensor data processing tasks may be issued with notification provided to a manager of the enterprise WAN. The method for determining an adjusted amount of CO2 that would be emitted upon shifting execution of an IoT sensor data processing task from a plurality of AP IoT servers to the orchestrating IoT gateway device information handling system may then end.

FIG. 5 is a flow diagram illustrating a method of executing a load-balancing instruction to shift execution of a common IoT data processing task from a plurality of Access Point (AP) Internet of Things (IoT) servers to an orchestrating IoT gateway device information handling system to minimize CO2 emissions according to an embodiment of the present disclosure. As described herein, the hardware processor of the orchestrating IoT gateway device information handling system executing code instructions of the CO2 minimizing IoT edge gateway data processing orchestration system may identify common IoT sensor data processing tasks occurring at a plurality of different AP IoT sensors, and may transmit an instruction to each of the AP IoT servers currently executing the common data processing task to cease this execution. By executing the common data processing task in such a way at the orchestrating IoT gateway device information handling system on the unprocessed IoT sensor data received from a plurality of AP IoT servers and their IoT sensors, the hardware processor of the orchestrating IoT gateway device information handling system executing code instructions of the CO2 minimizing IoT edge gateway data processing orchestration system may minimize total CO2 emitted during the transfer of IoT sensor data to a cloud computing platform through various servers and gateways of an MNO or MVNO network of an enterprise WAN as well as transmission across any public network links from the orchestrating IoT gateway device information handling system 200 to a backend enterprise application in the cloud.

At block 502, the hardware processor of the orchestrating IoT gateway device information handling system executing code instructions of the CO2 minimizing IoT edge gateway data processing orchestration system may receive user approval for a load-balancing technique to reduce CO2 emissions from one or more participating AP IoT servers. For example, in an embodiment described with reference to FIG. 2, the CO2 minimizing IoT edge gateway data processing orchestration system 280 receive an indication that a user or manager for the enterprise WAN 260 has approved the load-balancing technique for decreasing CO2 emissions from the initial CO2 emissions value to the adjusted CO2 emissions value, as described in greater detail above with respect to blocks 312 and 314 of FIG. 3. In other embodiments, determination of total CO2 savings for transfer or IoT sensor data may automatically trigger a shift of execution for identified common IoT sensor data processing tasks to the orchestrating IoT gateway device information handling system 200.

The hardware processor of the orchestrating IoT gateway device information handling system in an embodiment at block 504 may execute code instructions of the CO2 minimizing IoT edge gateway data processing orchestration system to identify a load-balancing code instruction for cessation of a common data processing task at relevant AP IoT servers that are associated with a preset IoT sensor data processing task classification identified as common by the orchestrating IoT gateway device information handling system. For example, in an embodiment described with respect to FIG. 2, the hardware processor of the orchestrating IoT gateway device information handling system 200 executing code instructions of the CO2 minimizing IoT edge gateway data processing orchestration system 280 in an embodiment may identify a load-balancing code instruction for cessation of the common IoT sensor data processing task at the relevant AP IoT servers in the enterprise WAN 260 that are associated with the preset IoT sensor data processing task classification type identified as common by the orchestrating IoT gateway device information handling system 200 and reducing overall CO2 if shifted. More specifically, in an embodiment, the CO2 minimizing IoT edge gateway data processing orchestration system 280 may have identified a plurality of JSON incidents received from both AP IoT server A 220 and AP IoT server D 210 having a IoT sensor data processing task classification "candidate_processing-_task," and a value of "encryption." In such an embodiment, the hardware processor of the orchestrating IoT gateway device information handling system 200 executing code instructions of the CO2 minimizing IoT edge gateway data processing orchestration system 280 may identify a load-balancing code instruction for cessation of the common encryption task at AP IoT server A 220 and AP IoT server D 210 that is associated with the classification name "candidate_processing_task," having a value of "encryption." As another example, in an embodiment, the CO2 minimizing IoT edge gateway data processing orchestration system 280 may have identified a plurality of JSON incidents received from both AP IoT server A 220 and AP IoT server D 210 having a IoT sensor data processing task classification "candidate_processing_task." and a value of "JSON_conversion." In such an embodiment, the hardware processor of the orchestrating IoT gateway device information handling system 200 executing code instructions of the CO2 minimizing IoT edge gateway data processing orchestration system 280 may identify a load-balancing code instruction for cessation of the common JSON conversion task at AP IoT server A 220 and AP IoT server D 210 that is associated with the IoT sensor data processing task classification name "candidate_processing_task," having a value of "JSON conversion."

The hardware processor of the orchestrating IoT gateway device information handling system 200 executing code instructions of the CO2 minimizing IoT edge gateway data processing orchestration system 280 in an embodiment may transmit the load-balancing code instructions to the relevant, identified AP IoT servers 220 and 210 within the enterprise WAN 260 for shifting IoT sensor data processing tasks. For example, the hardware processor of the orchestrating IoT gateway device information handling system 200 executing code instructions of the CO2 minimizing IoT edge gateway data processing orchestration system 280 may transmit an instruction to AP IoT servers 210 and 220 to stop execution of the common encryption task, or the common JSON conversion task in various embodiments herein.

At block 506, identified relevant AP IoT servers for shifting IoT sensor data processing tasks receive load-balancing code instructions to stop execution of common data processing tasks on incoming unprocessed sensor data in an embodiment. For example, following receipt of these load-balancing instructions at the AP IoT servers 210 and 220 in an embodiment, each of the AP IoT servers 210 and 220 may transmit collect unprocessed IoT sensor data from a plurality of IoT sensors (e.g., 211*a* to 211*n*, or 221*a* to 221*n*, respectively).

The AP IoT servers in an embodiment at block 510 may collect unprocessed IoT sensor data and transmit unprocessed IoT sensor data based on received load-balancing instructions to the orchestrating IoT gateway for storage in IoT sensor data storage. For example, instead of performing the common IoT sensor data processing task at the AP IoT servers 210 or 220, the AP IoT servers 210 and 220 in such an embodiment may follow the load-balancing instructions received from the orchestrating IoT gateway device information handling system 200 and transmit the unprocessed IoT sensor data directly to the orchestrating IoT gateway device information handling system 200 for processing there.

At block 512, the hardware processor of the orchestrating IoT gateway device information handling system executing code instructions of the CO2 minimizing IoT edge gateway data processing orchestration system may determine whether unprocessed IoT sensor data has been received from all AP IoT servers that are transmitting unprocessed IoT sensor data pursuant to the load-balancing instruction. For example, the hardware processor of the orchestrating IoT gateway device information handling system 200 executing code instructions of the CO2 minimizing IoT edge gateway data processing orchestration system 280 in an embodiment may gather such unprocessed IoT sensor data from each of the AP IoT servers (e.g., 210 and 220) that have received the load-balancing instruction prior to execution of the common IoT sensor data processing task at the orchestrating IoT gateway device information handling system 200. This may be necessary in order to take advantage of the fact that the orchestrating IoT gateway device information handling system 200 has access to a larger pool of IoT sensor data than either of the AP IoT servers (e.g., 220 and 210). As described herein, maximizing the volume of underlying unprocessed IoT sensor data upon which a single IoT sensor data processing task is performed at the orchestrating IoT gateway device information handling system 200 in an embodiment may decrease the size of IoT sensor data being transmitted from the AP IoT servers to the orchestrating IoT gateway device information handling system 200 in the enterprise WAN since the IoT sensor data is unprocessed with processed data overhead margin. Additionally, the processing of a larger pool of unprocessed IoT sensor data at the orchestrating IoT gateway device information handling system 200 results in reduced volume for transmission of processed IoT sensor data across public network links to the cloud computing platform 290 due to a consistently sized overhead from the executed IoT sensor data processing task regardless of the volume of underlying IoT sensor data processed. Thus, the $CO_2$ emitted due to transmission of IoT sensor data to the cloud for the enterprise may be reduced as a consequence. If unprocessed IoT sensor data has not been received from all AP IoT servers that have received the load-balancing instruction, the method may proceed to block 510 for the AP IoT servers that have not yet delivered unprocessed IoT sensor data to collect and transmit that data to the orchestrating IoT gateway device information handling system prior to execution of the common processing task.

In an embodiment in which unprocessed IoT sensor data has been received from all AP IoT servers that have received the load-balancing instruction, the hardware processor of the orchestrating IoT gateway device information handling system executing code instructions of the $CO_2$ minimizing IoT edge gateway data processing orchestration system may execute the common IoT sensor data processing task on the pooled, unprocessed IoT sensor data from plural AP IoT servers to generate batch-processed IoT sensor data at block 514. For example, upon receipt of the unprocessed IoT sensor data from each of the AP IoT servers (e.g., 210 and 220) that received the load-balancing instruction, the orchestrating IoT gateway device information handling system 200 may execute the common processing task on the unprocessed IoT sensor data received. More specifically, in an embodiment in which the common IoT sensor data processing task is encryption, the orchestrating IoT gateway device information handling system 200 may execute the encryption task (e.g., 256 bit SAE) on the unprocessed IoT sensor data received from IoT servers 220 and 210. As another example, in an embodiment in which the common IoT sensor data processing task is conversion to JSON, the orchestrating IoT gateway device information handling system 200 may convert the unprocessed IoT sensor data received from IoT servers 220 and 210 into a single JSON incident of JSON processed IoT sensor data. If execution of the common processing task at the orchestrating IoT gateway device information handling system is complete, the method may proceed to block 516.

At block 516, the orchestrating IoT gateway device information handling system may transmit the processed sensor data to the cloud computing platform in an embodiment. For example, the orchestrating IoT gateway device information handling system 200 in an embodiment may transmit the processed IoT sensor data generated through execution of the common IoT sensor data processing task at the orchestrating IoT gateway device information handling system 200 to the cloud computing platform 290 such as via a public network link (e.g., an internet link). More specifically, in an embodiment in which the common IoT sensor data processing task is encryption, the orchestrating IoT gateway device information handling system 200 may transmit the encrypted IoT sensor data to the cloud computing platform 290. As another example, in an embodiment in which the common IoT sensor data processing task is conversion to JSON, the orchestrating IoT gateway device information handling system 200 may transmit the JSON processed IoT sensor data to the cloud computing platform 290.

By executing the common data processing task in such a way at the orchestrating IoT gateway device information handling system on the unprocessed IoT sensor data received from a plurality of AP IoT servers, the hardware processor of the orchestrating IoT gateway device information handling system executing code instructions of the $CO_2$ minimizing IoT edge gateway data processing orchestration system may minimize total $CO_2$ emitted during the transfer of IoT sensor data from AP IoT servers to a cloud computing platform through various servers and gateways of an enterprise WAN, such as MNO or MVNO network controlled by an enterprise for plural enterprise facilities or any public network links to cloud computing platforms. The method of shifting execution of a common IoT data processing task from a plurality of AP IoT servers to an orchestrating IoT gateway device information handling system to minimize $CO_2$ emissions may then end.

The blocks of the flow diagrams of FIGS. 3, 4, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system operating as an orchestrating Internet of Things (IoT) gateway device executing a carbon dioxide (CO2) minimizing IoT edge gateway data processing orchestration system comprising:
- a network interface device receiving, via an enterprise controlled wide area network (enterprise WAN), operational telemetry measurements, including power consumption analytics, IoT sensor data transfer volume, and geographic location for each of a plurality of access point (AP) IoT servers, and receiving processed IoT sensor data generated by alteration of unprocessed IoT sensor data by each of the plurality of AP IoT servers executing a common data processing method, where the plurality of AP IoT servers gather unprocessed IoT sensor data from a plurality of IoT sensors;
- a hardware processor executing code instructions of the CO2 minimizing IoT edge gateway data processing orchestration system to determine that an initial volume of CO2 emitted per unit of processed IoT sensor data transferred from each of the plurality of AP IoT servers to a cloud computing platform, via the orchestrating IoT gateway device in the enterprise WAN, is greater than an adjusted volume of estimated CO2 that would be emitted per unit of unprocessed IoT sensor data if the common data processing method were executed at the orchestrating IoT gateway device information handling system instead of at the plurality of AP IoT servers; and
- the network interface device transmitting a code instruction to each of the plurality of AP IoT servers to cease execution of the common data processing method, and to transmit later-recorded unprocessed IoT sensor data to the orchestrating IoT gateway device information handling system.

2. The information handling system of claim 1, wherein the common data processing method is an encryption method.

3. The information handling system of claim 1, wherein the common data processing method is a conversion of the unprocessed IoT sensor data to a predetermined data interchange format agreed upon between data sinks and sources.

4. The information handling system of claim 1, wherein the common data processing method is a conversion of the unprocessed IoT sensor data to a JavaScript Object Notation (JSON) format.

5. The information handling system of claim 1 further comprising:
- the hardware processor executing the common data processing method on unprocessed IoT sensor data received from the plurality of AP IoT servers to generate batch-processed IoT sensor data; and
- the network interface device to transmit the batch-processed IoT sensor data to the cloud computing platform.

6. The information handling system of claim 1 further comprising:
- the hardware processor executing code instructions of the CO2 minimizing IoT edge gateway data processing orchestration system to determine the initial volume of CO2 emissions per unit of processed IoT sensor data based on power consumed during transmission of processed IoT sensor data, volume of IoT sensor data transmitted, and geographic location for each of the plurality of AP IoT servers.

7. The information handling system of claim 1 further comprising:
- the hardware processor executing code instructions of the CO2 minimizing IoT edge gateway data processing orchestration system to predict the adjusted volume of estimated CO2 emissions per unit of IoT sensor data based on an amount of unprocessed IoT sensor data received at the orchestrating IoT gateway and a predicted amount of batch-processed IoT sensor data generated by the hardware processor executing the common data processing method on the unprocessed IoT sensor data received from the plurality of AP IoT servers.

8. A method of orchestrating data processing of IoT sensor data transmitted from a plurality of Access Point (AP) Internet of Things (IoT) servers to a cloud computing platform, via an orchestrating IoT gateway device information handling system to minimize carbon dioxide (CO2) emissions comprising:
- receiving, via a network interface device of the orchestrating IoT gateway device information handling system in an enterprise controlled wide area network (enterprise WAN), operational telemetry measurements, including power consumption analytics, IoT sensor data transfer volume, and geographic location for each of the plurality of AP IoT servers, and receiving processed IoT sensor data generated by alteration of unprocessed IoT sensor data by each of the plurality of AP IoT servers executing a common data processing method, where the AP IoT servers gather the unprocessed IoT sensor data from a plurality of wireless IoT sensor in a narrow band IoT (NB-IoT) wireless neighborhood of each AP IoT server;
- determining, via a hardware processor executing code instructions, that an initial volume of CO2 emitted per unit of processed IoT sensor data transferred from each of the plurality of AP IoT servers to a cloud computing platform, via the orchestrating IoT gateway device information handling system in the enterprise WAN, is greater than an adjusted volume of estimated CO2 that would be emitted per unit of unprocessed IoT sensor data if the common data processing method were executed at the orchestrating IoT gateway device information handling system instead of at the plurality of AP IoT servers; and
- transmitting, via the network interface device, a recommendation for display to users for each of the plurality of AP IoT servers to cease execution of the common data processing method to alter the unprocessed IoT sensor data, and a comparison between the initial volume of CO2 per unit of processed IoT sensor data transmitted and the adjusted volume of estimated CO2 per unit of unprocessed IoT sensor data transmitted.

9. The method of claim 8 further comprising:
receiving, via the network interface device, an indication of user acceptance of the recommendation; and
transmitting a code instruction to each of the plurality of AP IoT servers to cease execution of the common data processing method and to transmit later-recorded unprocessed IoT sensor data to the orchestrating IoT gateway device information handling system.

10. The method of claim 8, wherein the common data processing method is an encryption method.

11. The method of claim 8, wherein the common data processing method is a conversion of the unprocessed IoT sensor data to a predetermined data interchange format agreed upon between data sinks and sources.

12. The method of claim 8, wherein the common data processing method is a conversion of the unprocessed IoT sensor data to a JavaScript Object Notation (JSON) format.

13. The method of claim 8, wherein the common data processing method is a conversion of the unprocessed IoT sensor data to an Extensive Markup Language (XML) format.

14. The method of claim 8 further comprising:
executing the common data processing method on unprocessed IoT sensor data received from the plurality of AP IoT servers, via the hardware processor of the orchestrating IoT gateway device information handling system, to generate batch-processed IoT sensor data; and
transmitting, via the network interface device, the batch-processed IoT sensor data to the cloud computing platform.

15. An information handling system of an orchestrating Internet of Things (IoT) gateway device executing a carbon dioxide (CO2) minimizing IoT edge gateway data processing orchestration system comprising:
a network interface device receiving, via an enterprise controlled wide area network (enterprise WAN), operational telemetry measurements, including power consumption analytics, IoT sensor data transfer volume, and geographic location for each of a plurality of access point (AP) IoT servers, and receiving processed IoT sensor data generated by alteration of unprocessed IoT sensor data by each of the plurality of AP IoT servers executing a common IoT sensor data processing method, where the plurality of AP IoT servers gather unprocessed IoT sensor data from a plurality of IoT sensors;
a hardware processor executing code instructions of the CO2 minimizing IoT edge gateway data processing orchestration system to determine that an initial volume of CO2 emitted per unit of processed IoT sensor data transferred from each of the plurality of AP IoT servers to a cloud computing platform, via the orchestrating IoT gateway information handling system in the enterprise WAN, is greater than an adjusted volume of estimated CO2 that would be emitted per unit of unprocessed IoT sensor data if the common data processing method were executed at the orchestrating IoT gateway device information handling system instead of at the plurality of AP IoT servers;
the hardware processor executing code instructions of the CO2 minimizing IoT edge gateway data processing orchestration system to predict the adjusted volume of estimated CO2 emissions per unit of IoT sensor data based on an amount of unprocessed IoT sensor data received at the orchestrating IoT gateway device information handling system and a predicted amount of batch-processed IoT sensor data generated by the hardware processor of the orchestrating IoT gateway device information handling system executing the common data processing method on the unprocessed IoT sensor data received from the plurality of AP IoT servers; and
the network interface device to transmit a code instruction to each of the plurality of AP IoT servers to cease execution of the common data processing method and to transmit later-recorded unprocessed IoT sensor data to the orchestrating IoT gateway device information handling system.

16. The information handling system of claim 15 further comprising:
the hardware processor executing the common data processing method on unprocessed IoT sensor data received from the plurality of AP IoT servers to generate batch-processed IoT sensor data; and
the network interface device to transmit the batch-processed IoT sensor data to the cloud computing platform.

17. The information handling system of claim 15 further comprising:
the hardware processor executing code instructions of the CO2 minimizing IoT edge gateway data processing orchestration system to determine the initial volume of CO2 emissions per unit of processed IoT sensor data based on power consumed during transmission of processed IoT sensor data, volume of IoT sensor data transmitted, and geographic location for each of the plurality of AP IoT servers.

18. The information handling system of claim 15 further comprising:
the network interface device transmitting a recommendation for display to users for each of the plurality of AP IoT servers to cease execution of the common data processing method to alter the unprocessed IoT sensor data, and a comparison between the initial volume of CO2 per unit of processed IoT sensor data transmitted in the enterprise WAN and the adjusted volume of estimated CO2 per unit of unprocessed IoT sensor data transmitted; and
the network interface device to receive indication of user acceptance of the recommendation.

19. The information handling system of claim 15, wherein the common data processing method is a conversion of the unprocessed IoT sensor data to an Extensive Markup Language (XML) format.

20. The information handling system of claim 15, wherein the common data processing method is an encryption method.

* * * * *